(12) United States Patent
Jeong et al.

(10) Patent No.: US 12,223,856 B2
(45) Date of Patent: Feb. 11, 2025

(54) APPARATUS FOR PROVIDING LEARNING QUESTIONS USING GAMES, AND OPERATING METHOD OF SYSTEM FOR PROVIDING LEARNING QUESTIONS HAVING THE SAME

(71) Applicant: WOONGJIN THINKBIG CO., LTD., Paju-si (KR)

(72) Inventors: Jinhwan Jeong, Paju-si (KR); Seori Park, Paju-si (KR); Sewon Jo, Paju-si (KR); Hari Im, Paju-si (KR); Nuri Lim, Paju-si (KR); Haejin Kim, Paju-si (KR)

(73) Assignee: WOONGJIN THINKBIG CO., LTD., Paju-si (KR)

( * ) Notice: Subject to any disclaimer, the term of this patent is extended or adjusted under 35 U.S.C. 154(b) by 76 days.

(21) Appl. No.: 18/133,427

(22) Filed: Apr. 11, 2023

(65) Prior Publication Data
US 2024/0221529 A1 Jul. 4, 2024

(30) Foreign Application Priority Data

Dec. 29, 2022 (KR) .................. 10-2022-0188699
Jan. 30, 2023 (KR) .................. 10-2023-0011743

(51) Int. Cl.
G09B 7/00 (2006.01)
G09B 7/06 (2006.01)
G09B 7/02 (2006.01)
G09B 19/02 (2006.01)

(52) U.S. Cl.
CPC .................. *G09B 7/06* (2013.01); *G09B 7/02* (2013.01); *G09B 19/025* (2013.01)

(58) Field of Classification Search
CPC .............................. G09B 7/06; G09B 19/025
See application file for complete search history.

(56) References Cited

U.S. PATENT DOCUMENTS

| 6,370,355 B1 * | 4/2002 | Ceretta | ................... G09B 7/02 434/323 |
| 2009/0226870 A1 * | 9/2009 | Minotti | ................... G09B 7/00 434/307 R |

(Continued)

FOREIGN PATENT DOCUMENTS

| KR | 10-2015-0089425 A | 8/2015 |
| KR | 10-1905807 B1 | 10/2018 |

(Continued)

OTHER PUBLICATIONS

KR Office Action dated May 26, 2023 as received in Application No. 10-2023-0011743.

*Primary Examiner* — Peter R Egloff
(74) *Attorney, Agent, or Firm* — Maschoff Brennan

(57) ABSTRACT

The present disclosure relates to a technology for providing learning questions on the basis of one learning level in a plurality of games. The learning level of a learner whose learning level has not been set is set by providing the learner with a set number of evaluation questions. A next evaluation question for the learner is set based on learning question solving results of the learner for an evaluation question. Learning questions based on a learning level are provided in various games that are executed in a gaming device.

20 Claims, 23 Drawing Sheets

(56) References Cited

U.S. PATENT DOCUMENTS

| | | | | |
|---|---|---|---|---|
| 2010/0041455 A1* | 2/2010 | Kura | ........................ | A63F 13/80 |
| | | | | 463/9 |
| 2012/0329029 A1* | 12/2012 | Rauta | ........................ | G09B 7/02 |
| | | | | 434/350 |
| 2014/0193795 A1* | 7/2014 | Tavolacci | .................. | G09B 7/02 |
| | | | | 434/362 |
| 2014/0272905 A1* | 9/2014 | Boersma | .................. | G09B 7/04 |
| | | | | 434/362 |
| 2016/0127010 A1* | 5/2016 | Rho | ........................ | G06N 7/01 |
| | | | | 375/257 |
| 2016/0358493 A1* | 12/2016 | Bilic | ........................ | G09B 7/00 |

FOREIGN PATENT DOCUMENTS

| | | |
|---|---|---|
| KR | 10-2367992 B1 | 3/2022 |
| KR | 10-2374101 B1 | 3/2022 |
| KR | 10-2380768 B1 | 3/2022 |

* cited by examiner

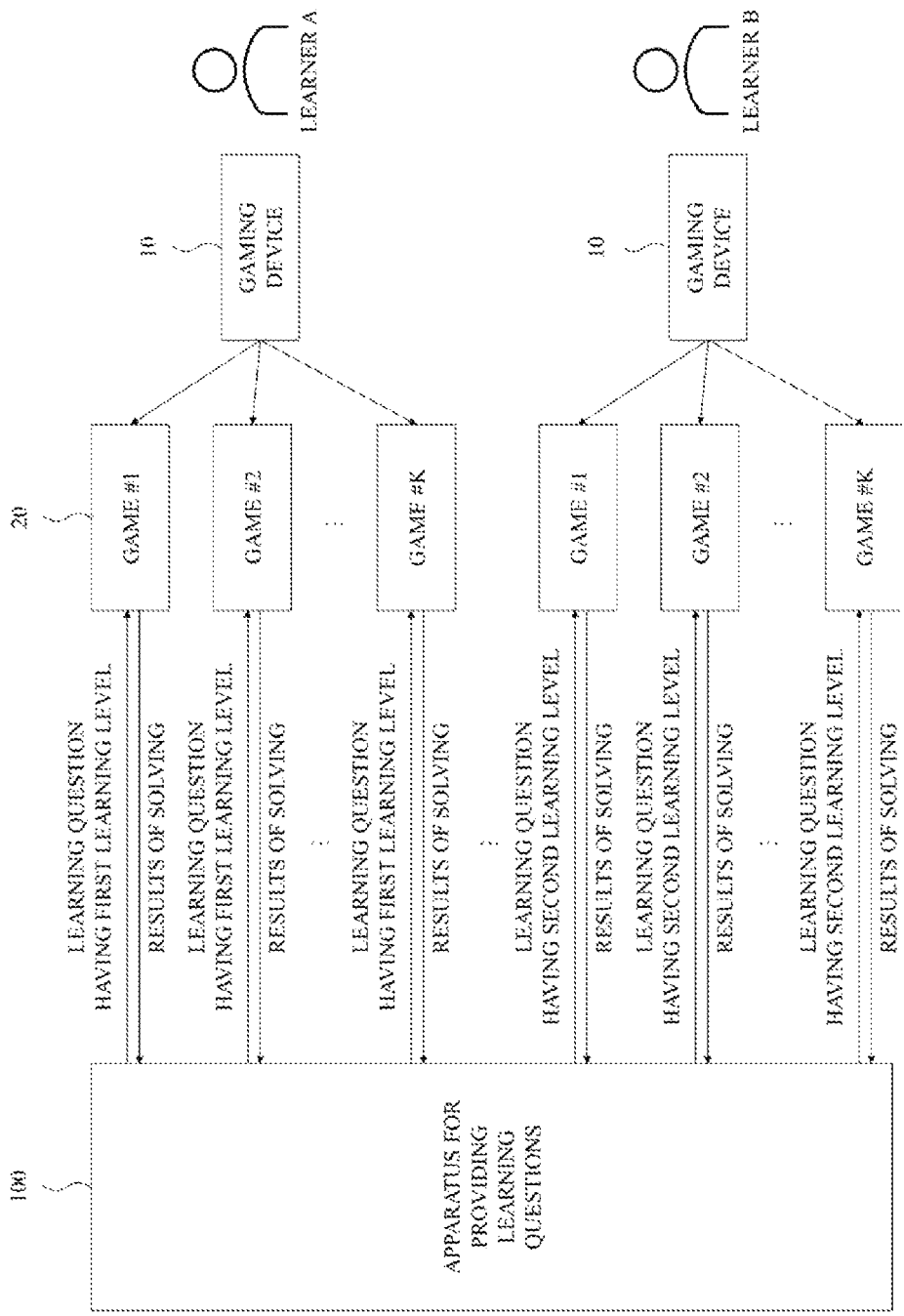

[FIG. 2]
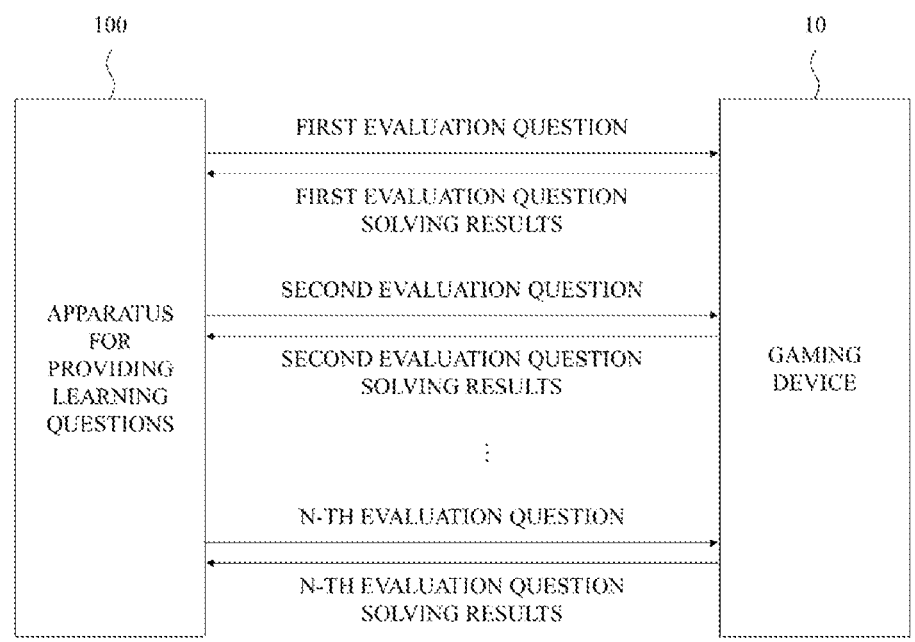
[FIG. 3]
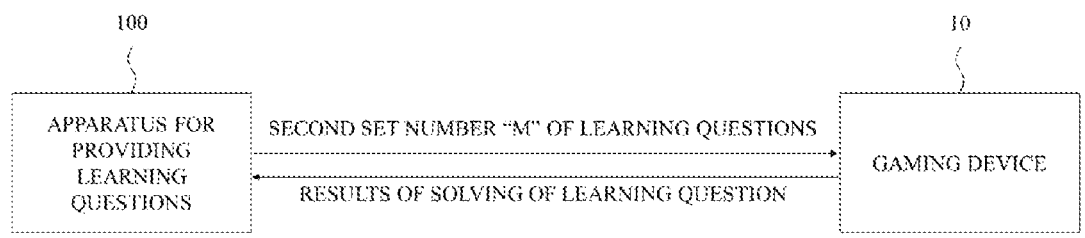

[Fig. 4]
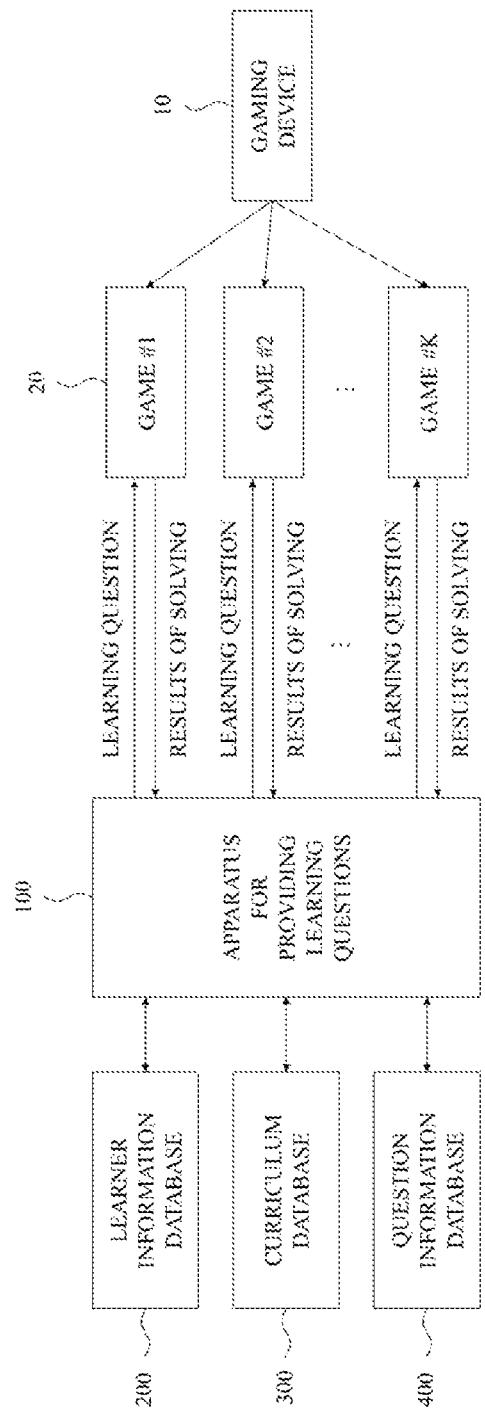

[FIG. 5]

| LEARNER IDENTIFIER | ID | PASSWORD | LEARNER NAME | AGE | GRADE | SEMESTER | LEARNING LEVEL |
|---|---|---|---|---|---|---|---|
| L0001 | ID0001 | PW0001 | KIM WOONGJIN | 11 | FOURTH GRADE | 1 | A08_0_1 |
| L0002 | ID0002 | PW0002 | LEE WOONGJIN | 12 | SIXTH GRADE | 2 | A15_0_1 |
| L0003 | ID0003 | PW0003 | NAM WOONGJIN | 15 | SECOND GRADER IN MIDDLE SCHOOL | 2 | K06_0_1 |
| ... | ... | ... | ... | ... | ... | ... | ... |

[Fig. 6]

| LEARNER IDENTIFIER | ID | PASSWORD | GAME ID | LEARNER NAME | AGE | GRADE | SEMESTER | LEARNING LEVEL |
|---|---|---|---|---|---|---|---|---|
| L0001 | ID0001 | PW0001 | MAF89347928374928371... | KIM WOONGJIN | 11 | FOURTH GRADE | 1 | A08_0_1 |
| L0002 | ID0002 | PW0002 | MAF98837893479283741... | LEE WOONGJIN | 12 | SIXTH GRADE | 2 | A15_0_1 |
| L0003 | ID0003 | PW0003 | MAF78939883374479281... | NAM WOONGJIN | 15 | SECOND GRADER IN MIDDLE SCHOOL | 2 | K06_0_1 |
| ⋮ | ⋮ | ⋮ | ⋮ | ⋮ | ⋮ | ⋮ | ⋮ | ⋮ |

[Fig. 7]

| LEARNING LEVEL | LEARNING LEVEL NAME | SUB-SUBJECT NAME | DETAILED CONTENTS | SUB-SUBJECT CODE | EDUCATION PROCESS | | | | AGE |
|---|---|---|---|---|---|---|---|---|---|
| | | | | | GRADE | SEMESTER | UNIT | UNIT NAME | |
| ... | ... | ... | ... | ... | | | ... | | ... |
| 51 | CALCULATION OF POLYNOMIAL EQUATION | CALCULATION OF POLYNOMIAL EQUATION 1 | ADDITION AND SUBTRACTION OF POLYNOMIAL EQUATION | K06_0_1 | SECOND GRADER IN MIDDLE SCHOOL | 1 | 2 | CALCULATION OF EQUATION | 14 |
| | | CALCULATION OF POLYNOMIAL EQUATION 2 | CHECK QUADRATIC EQUATION, ADDITION AND SUBTRACTION OF QUADRATIC EQUATION | K06_0_2 | SECOND GRADER IN MIDDLE SCHOOL | 1 | 2 | CALCULATION OF EQUATION | 14 |
| | | CALCULATION OF POLYNOMIAL EQUATION 3 | CALCULATION OF POLYNOMIAL EQUATIONS HAVING SEVERAL PARENTHESES | K06_0_3 | SECOND GRADER IN MIDDLE SCHOOL | 1 | 2 | CALCULATION OF EQUATION | 14 |
| | | CALCULATION OF POLYNOMIAL EQUATION 4 | MONOMIAL EXPRESSION AND MULTIPLICATION OF MONOMIAL EXPRESSION | K07_0_1 | SECOND GRADER IN MIDDLE SCHOOL | 1 | 2 | CALCULATION OF EQUATION | 14 |
| | | CALCULATION OF POLYNOMIAL EQUATION 5 | DIVISION OF POLYNOMIAL EQUATION AND MONOMIAL EXPRESSION | K07_0_2 | SECOND GRADER IN MIDDLE SCHOOL | 1 | 2 | CALCULATION OF EQUATION | 14 |
| | | CALCULATION OF POLYNOMIAL EQUATION 6 | CALCULATION OF QUADRATIC MIXTURE OF POLYNOMIAL EQUATIONS | K08_0_1 | SECOND GRADER IN MIDDLE SCHOOL | 1 | 2 | CALCULATION OF EQUATION | 14 |
| | | CALCULATION OF POLYNOMIAL EQUATION 7 | SUBSTITUTION OF EQUATION | K08_0_2 | SECOND GRADER IN MIDDLE SCHOOL | 1 | 2 | CALCULATION OF EQUATION | 14 |
| ... | | | | | | | | | ... |

[Fig. 8]

| STEP NAME | ADDITION | | | | SUBTRACTION | | | |
|---|---|---|---|---|---|---|---|---|
| | SUB-SUBJECT CODE | SUB-SUBJECT NAME | DETAILED CONTENTS | STEP NAME | SUB-SUBJECT CODE | SUB-SUBJECT NAME | DETAILED CONTENTS | |
| SINGLE-DIGIT ADDITION WITHOUT ADVANCING-UP | B02_0_1 | SINGLE-DIGIT ADDITION 1 | (SINGLE DIGIT)+(SINGLE DIGIT) HAVING SUM OF 9 OR LESS ① | SINGLE-DIGIT SUBTRACTION WITHOUT ADVANCING-DOWN | B08_1_1 | SINGLE-DIGIT SUBTRACTION 1 | (SINGLE DIGIT)-(SINGLE DIGIT) ① | |
| | B02_0_2 | SINGLE-DIGIT ADDITION 2 | (SINGLE DIGIT)+(SINGLE DIGIT) HAVING SUM OF 9 OR LESS ② | | B08_1_2 | SINGLE-DIGIT SUBTRACTION 2 | (SINGLE DIGIT)-(SINGLE DIGIT) ② | |
| | B03_0_1 | SINGLE-DIGIT ADDITION 3 | (SINGLE DIGIT)+(SINGLE DIGIT) HAVING SUM OF 9 OR LESS ③ | | B08_2_1 | SINGLE-DIGIT SUBTRACTION 3 | (SINGLE DIGIT)-(SINGLE DIGIT) ③ | |
| | B03_0_2 | SINGLE-DIGIT ADDITION 4 | (SINGLE DIGIT)+(SINGLE DIGIT) HAVING SUM OF 9 OR LESS ④ | | B08_2_2 | SINGLE-DIGIT SUBTRACTION 4 | (SINGLE DIGIT)-(SINGLE DIGIT) ④ | |
| | B04_0_1 | SINGLE-DIGIT ADDITION 5 | (SINGLE DIGIT)+(SINGLE DIGIT) HAVING SUM OF 9 OR LESS ⑤ | | B08_3_1 | SINGLE-DIGIT SUBTRACTION 5 | (SINGLE DIGIT)-(SINGLE DIGIT) ⑤ | |
| | B04_0_2 | SINGLE-DIGIT ADDITION 6 | (SINGLE DIGIT)+(SINGLE DIGIT) HAVING SUM OF 9 OR LESS ⑥ | | B08_3_2 | SINGLE-DIGIT SUBTRACTION 6 | (SINGLE DIGIT)-(SINGLE DIGIT) ⑥ | |
| ⋮ | ⋮ | ⋮ | ⋮ | ⋮ | ⋮ | ⋮ | ⋮ | |

[FIG. 9]
| QUESTION IDENTIFIER | QUESTION CONTENTS | TEXT CONTENTS | CORRECT ANSWER TO QUESTION | WRONG ANSWER TO QUESTION | SOLVING SPEED REFERENCE VALUE |
|---|---|---|---|---|---|
| Q0001 | 2×3 | ... | 6 | 5, 7, 8, 9 | T1, T2 |
| Q0002 | 231×2 | ... | 462 | 400, 420, 452, 472 | T3, T4 |
| Q0003 | 682×31 | ... | 22 | 20, 21, 23, 24 | T5, T6 |
| ... | ... | ... | ... | ... | ... |
[FIG. 10]
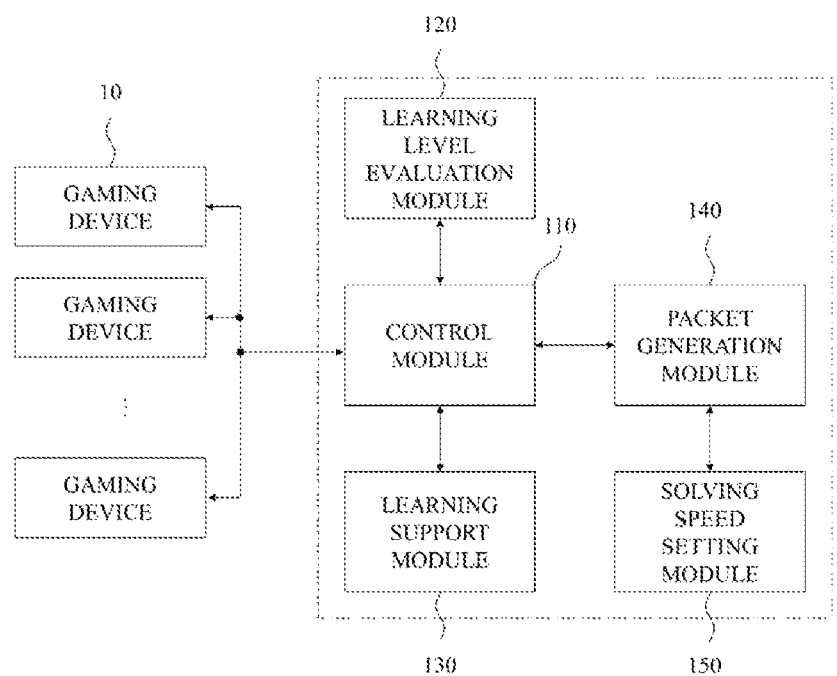

[FIG. 11]

| EVALUATION QUESTION REQUEST MESSAGE (PACKET) | | | |
|---|---|---|---|
| VARIABLE NAME | VARIABLE TYPE | PARAM TYPE | DESCRIPTION |
| X-API-KEY | STR | HEADER | Game API_KEY |
| gameCd | STR | BODY | GAME CODE |
| mbrId | STR | BODY | MEMBER ID |
| deviceNm | STR | BODY | DEVICE NAME |
| gameVer | STR | BODY | GAME VERSION |
| osSenCd | STR | BODY | OS TYPE |
| langCd | STR | BODY | LEARNING LANGUAGE CODE |
| timeZone | INT | BODY | KOREAN +9 |

[FIG. 12]

| LEARNING QUESTION REQUEST MESSAGE (PACKET) | | | |
|---|---|---|---|
| VARIABLE NAME | VARIABLE TYPE | PARAM TYPE | DESCRIPTION |
| X-API-KEY | STR | HEADER | GAME API_KEY |
| Authorization | STR | HEADER | MEMBER JWT |
| gameCd | STR | BODY | GAME CODE |
| mbrId | STR | BODY | MEMBER ID |
| gameVer | STR | BODY | GAME VERSION |
| osSenCd | STR | BODY | OS TYPE |
| deviceNm | STR | BODY | DEVICE NAME |
| langCd | STR | BODY | LEARNING LANGUAGE CODE |
| timeZone | INT | BODY | KOREAN +9 |

[FIG. 13]

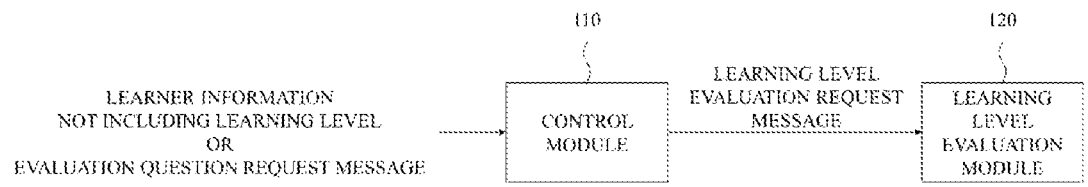

[FIG. 14]

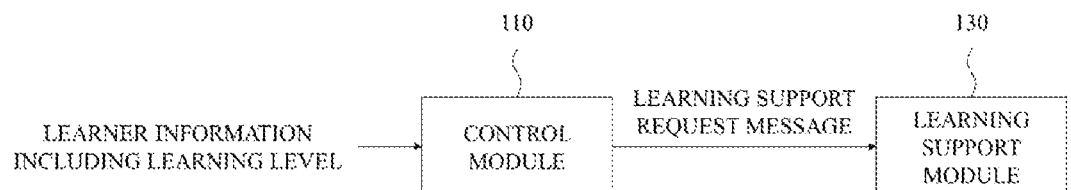

[FIG. 15]

| \multicolumn{4}{c}{EVALUATION QUESTION TRANSMISSION PACKET} |
|---|---|---|---|
| VARIABLE NAME | VARIABLE TYPE | PARAM TYPE | DESCRIPTION |
| result | BOOLEAN | BODY | RESULT CODE (SUCCESS: TRUE) |
| msg | STR | BODY | RESULT MESSAGE (SUCCESS) |
| data_sid | LONG | BODY | DIAGNOSIS ID |
| data_prgsCd | STR | BODY | PROGRESS CODE (W: DIAGNOSIS PROGRESS, E: DIAGNOSIS COMPLETED) |
| data_qstCd | STR | BODY | QUESTION IDENTIFIER |
| data_qstCn | STR | BODY | QUESTION CONTENTS |
| data_textCn | STR | BODY | TEXT CONTENTS |
| data_qstCransr | STR | BODY | CORRECT ANSWER TO QUESTION |
| data_qstWransr | STR | BODY | WRONG ANSWER TO QUESTION (CLASSIFIED BY COMMA) |
| data_accuracy | INT | BODY | DIAGNOSIS ACCURACY LEVEL |
| data_estQstNowNo | INT | BODY | NUMBER OF EVALUATION QUESTIONS SO FAR (INCLUDING CURRENT QUESTION) |
| data_estPreStgCd | STR | BODY | SUB-SUBJECT CODE OF EVALUATION QUESTION |

[FIG. 16]
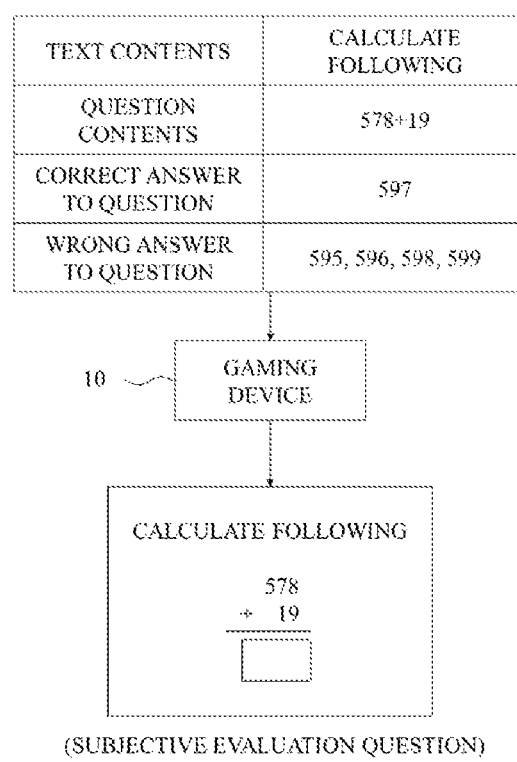

[FIG. 17]

| TEXT CONTENTS | CALCULATE FOLLOWING |
|---|---|
| QUESTION CONTENTS | 578÷19 |
| CORRECT ANSWER TO QUESTION | 597 |
| WRONG ANSWER TO QUESTION | 595, 596, 598, 599 |

10 — GAMING DEVICE

CALCULATE FOLLOWING

578 ÷ 19 = ☐

① 596  ② 597
③ 598  ④ 599

(MULTIPLE-CHOICE EVALUATION QUESTION)

[Fig. 18]

| EVALUATION QUESTION SOLVING RESULTS | | | |
|---|---|---|---|
| VARIABLE NAME | VARIABLE TYPE | PARAM TYPE | DESCRIPTION |
| X-API-KEY | STR | HEADER | GAME API_KEY |
| Authorization | STR | HEADER | MEMBER JWT |
| gameCd | STR | BODY | GAME CODE |
| mbrId | STR | BODY | MEMBER ID |
| prgsCd | STR | BODY | PROGRESS CODE. W: DIAGNOSIS PROGRESS E: DIAGNOSIS COMPLETED X: OTHERS CANCELLED |
| sid | STR | BODY | DIAGNOSIS ID |
| qstCd | STR | BODY | QUESTION IDENTIFIER OF SOLVED EVALUATION QUESTION |
| qstCransr | STR | BODY | INPUT ANSWER CONTENTS |
| ansrCwYn | STR | BODY | CORRECT ANSWER OR WRONG ANSWER - Y/N |
| slvTime | POSITIVE LONG (MUST BE GREATER THAN 0) | BODY | QUESTION SOLVING TIME (MS) |

[FIG. 19]

| LEARNING QUESTION TRANSMISSION PACKET | | |
|---|---|---|
| VARIABLE NAME | VARIABLE TYPE | DESCRIPTION |
| result | BOOLEAN | RESULT CODE (SUCCESS: TRUE) |
| msg | STR | RESULT MESSAGE (SUCCESS) |
| data_sid | LONG | LEARNING ID |
| data_bgnDt | STR | LEARNING BEGINNING TIME |
| data_qsts | LIST | QUESTION INFORMATION LIST |
| data_qsts_qstCd | STR | QUESTION IDENTIFIER |
| data_qsts_qstCn | STR | QUESTION CONTENTS |
| data_qsts_textCn | STR | TEXT CONTENTS |
| data_qsts_qstCransr | STR | CORRECT ANSWER TO QUESTION |
| data_qsts_qstWransr | STR | WRONG ANSWER TO QUESTION (CLASSIFIED BY COMMA) |

[FIG. 20]

| LEARNING QUESTION SOLVING RESULT PACKET | | | |
|---|---|---|---|
| VARIABLE NAME | VARIABLE TYPE | PARAM TYPE | DESCRIPTION |
| X-API-KEY | STR | HEADER | GAME API_KEY |
| Authorization | STR | HEADER | MEMBER JWT |
| gameCd | STR | BODY | GAME CODE |
| mbrId | STR | BODY | MEMBER ID |
| prgsCd | STR | BODY | PROGRESS CODE E: LEARNING COMPLETED X: OTHERS CANCELLED |
| sid | | BODY | LEARNING ID |
| bgnDt | STR | BODY | LEARNING BEGINNING TIME |
| data | LIST | BODY | QUESTION SOLVING RESULT LIST |
| data_qstCd | STR | BODY | QUESTION IDENTIFIER OF SOLVED LEARNING QUESTION |
| data_qstCransr | STR | BODY | CONTENTS OF CORRECT ANSWER INPUT BY LEARNER |
| data_ansrCwYn | STR | BODY | CORRECT ANSWER OR WRONG ANSWER - Y/N |
| data_slvTime | POSITIVE LONG | BODY | QUESTION SOLVING TIME (MS) |

[FIG. 21]

| QUESTION IDENTIFIER | QUESTION | FAST | NORMAL | SLOW |
|---|---|---|---|---|
| Q0010 | $2\frac{5}{12} - \frac{7}{8} - \frac{2}{3}$ | LESS THAN 40 SECONDS | 40 SECONDS TO 84 SECONDS | MORE THAN 84 SECONDS |
| Q0014 | $1\frac{7}{8} \times \frac{4}{5} \div 3 + 0.7$ | LESS THAN 26 SECONDS | 26 SECONDS TO 48 SECONDS | MORE THAN 48 SECONDS |

[Fig. 22]

EVALUATION RESULT TRANSMISSION PACKET

| VARIABLE NAME | VARIABLE TYPE | DESCRIPTION |
|---|---|---|
| result | BOOLEAN | RESULT CODE (SUCCESS: TRUE) |
| msg | STR | RESULT MESSAGE (SUCCESS) |
| data_explSpedCd | STR | SOLVING SPEED CODE (ESC01: SLOW, ESC02: NORMAL, ESC03: FAST) |
| data_explSped | INT | SOLVING SPEED VALUE (0~20) |
| data_lrnPrgsSusCd | STR | LEARNING PROGRESS STATE CODE (LPS01: EFFORT, LPS02: BASIC, LPS03: SUFFICIENT, LPS04: EXCELLENT) |
| data_acrcyCd | STR | SOLVING ACCURACY CODE (D: BELOW AVERAGE, C: NORMAL, B: HIGH, A: PERFECT) |
| data_explAcrcyRt | INT | SOLVING ACCURATE RATE (0~20) |

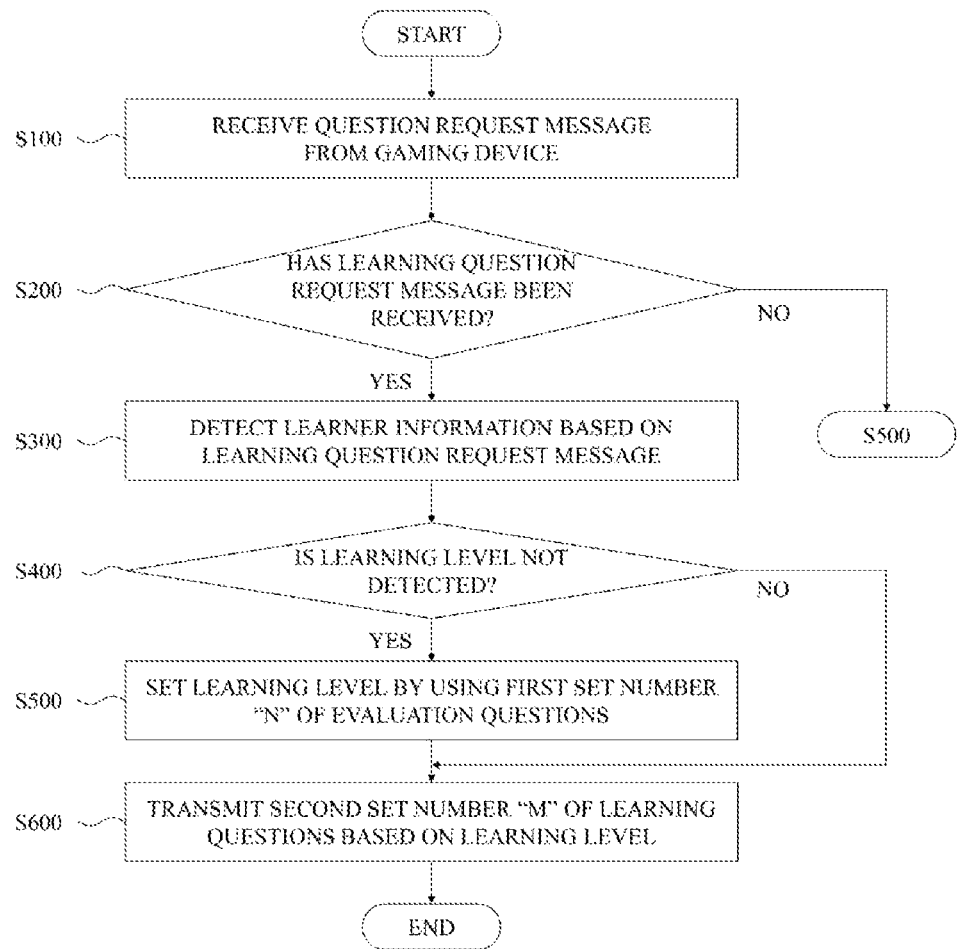
[FIG. 23]

[FIG. 24]
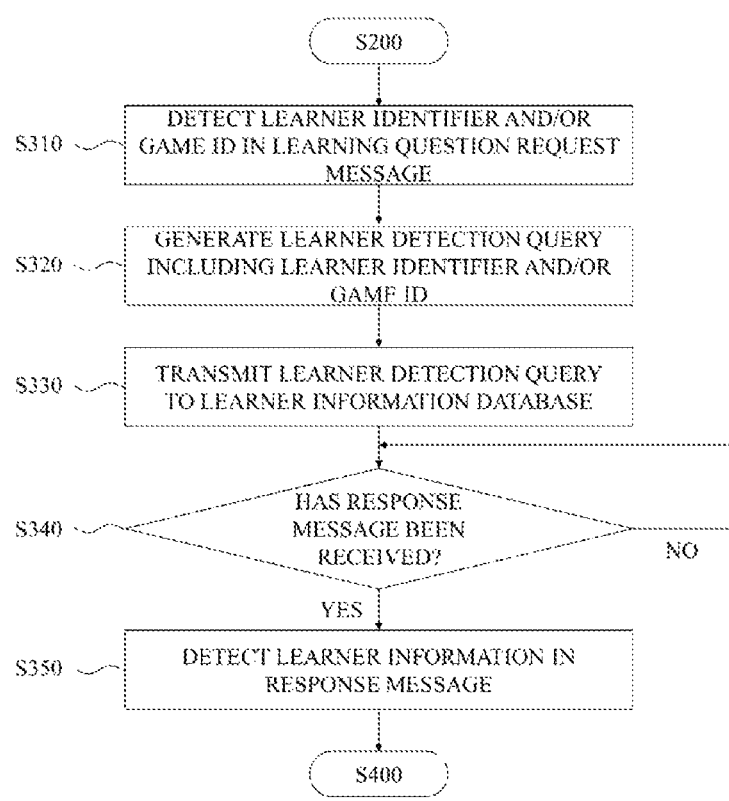

[FIG. 25]
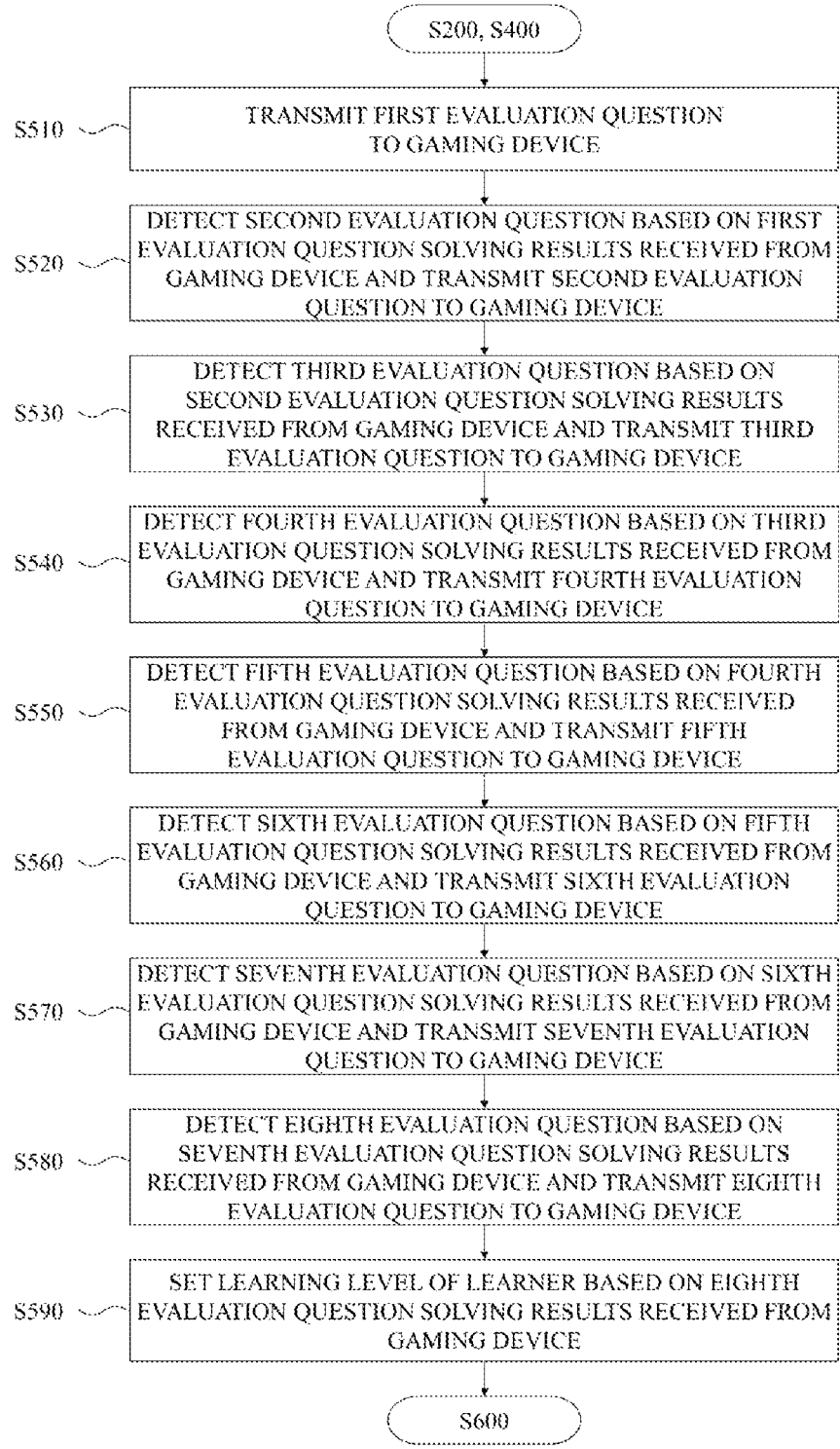

[FIG. 26]
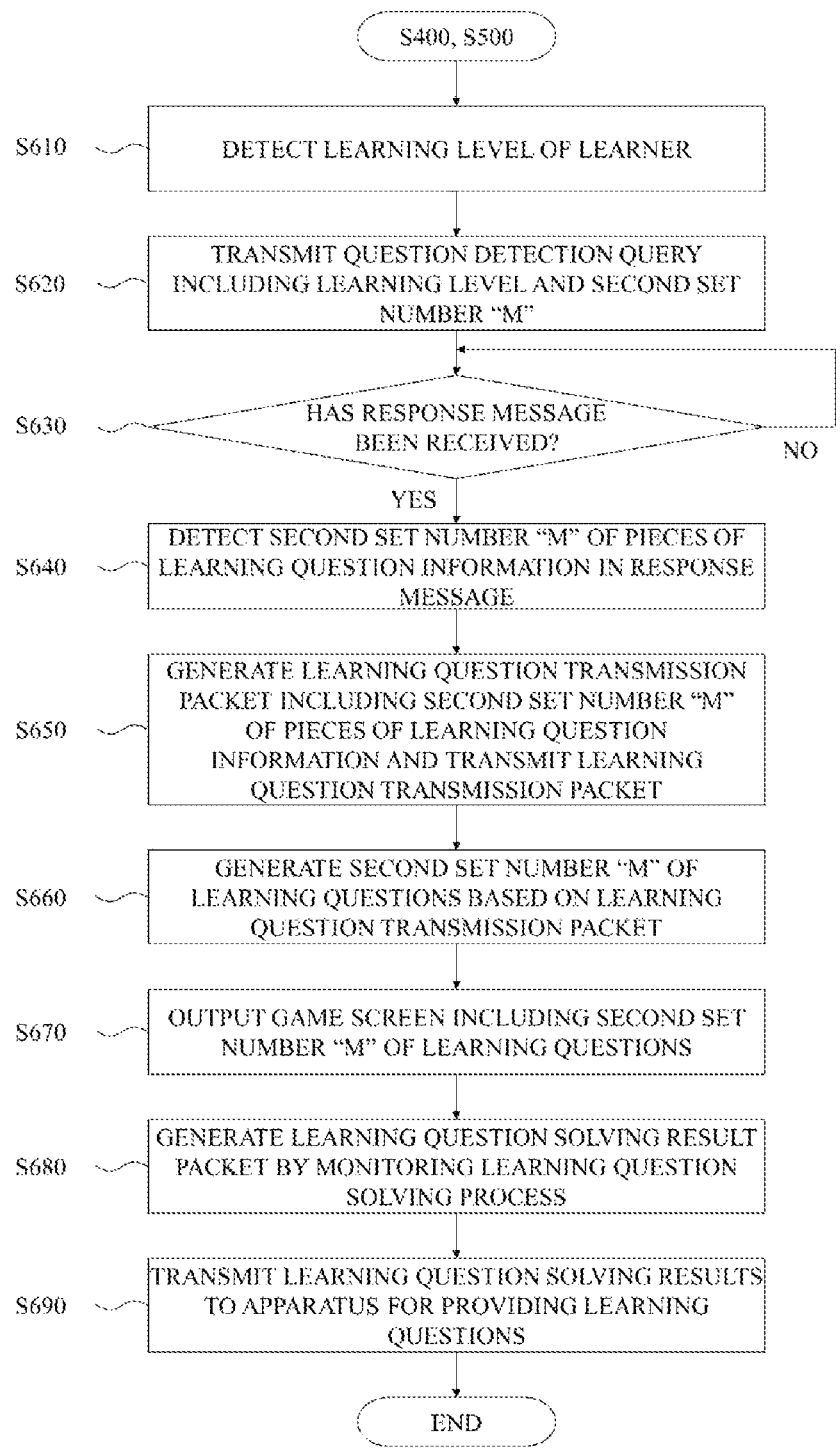

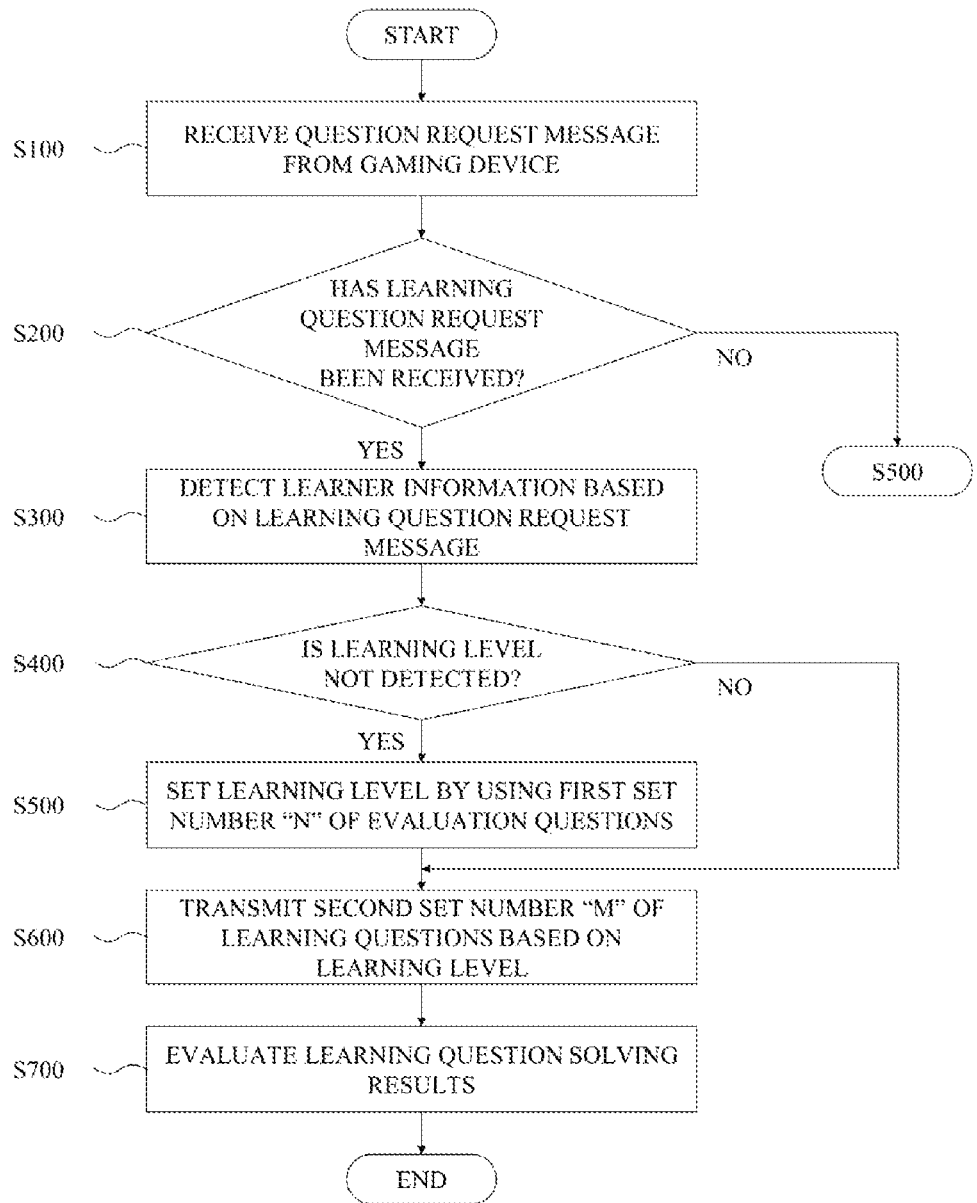
[FIG. 27]

[FIG. 28]
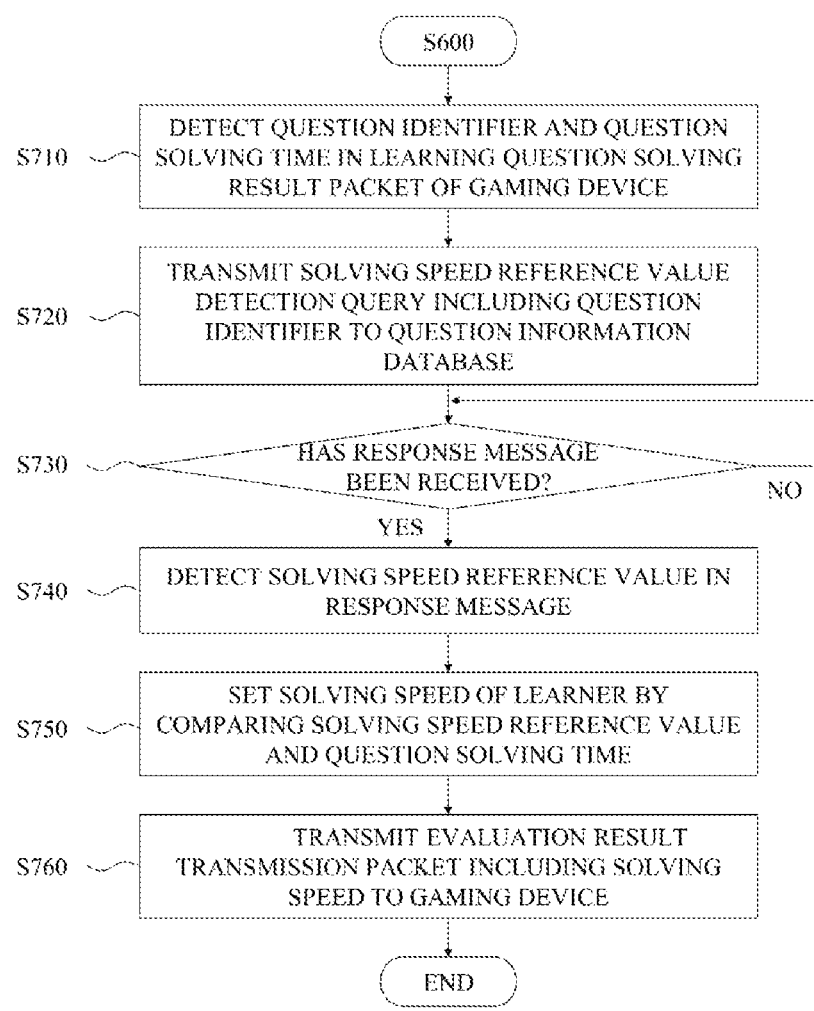

APPARATUS FOR PROVIDING LEARNING QUESTIONS USING GAMES, AND OPERATING METHOD OF SYSTEM FOR PROVIDING LEARNING QUESTIONS HAVING THE SAME

CROSS-REFERENCE(S) TO RELATED APPLICATIONS

This application claims priority to Korean Patent Application No. 10-2022-0188699, filed on Dec. 29, 2022, and Korean Patent Application No. 10-2023-0011743, filed on Jan. 30, 2023, the disclosure of which is incorporated herein by reference in its entirety.

BACKGROUND OF THE DISCLOSURE

Field of the Disclosure

The present disclosure relates to a technology for providing learning questions while operating in conjunction with a plurality of gaming devices in order to support learning using games.

Description of the Related Art

The calculation ability is a part corresponding to the fundamentals of mathematics learning. In mathematics learning for an elementary course of study, the proficiency of the calculation ability (i.e., learning) is targeted. Repeated learning in which learning questions are repeatedly solved and evaluated is chiefly used as a learning method for attaining the proficiency of the calculation ability.

However, such repeated learning is a departure from a learning method that is preferred by a learner because the repeated learning causes wearisome, and has low learning continuity with respect to a learner who has a short attention time.

In particular, since a younger learner has short learning continuity, a service server provides calculation learning to the learner through various games so that the learner can be interested in the calculation learning in order to improve the learning continuity of the learner.

However, conventionally, there is a problem in that only learning in which a learning level of a learner is not taken into consideration is provided because learning questions for calculation learning are provided to each of a plurality of gaming devices and the learning questions are presented to the learner in each gaming device.

Furthermore, conventionally, there are problems in that the learning level of learning questions that are provided in each game is different and a learner cannot perform continuous learning because learning questions are stored in each gaming device and the learning questions stored in the gaming device are provided to the learner through games.

The contents described in "the Related Art" help understanding of the background of the invention, and may include contents other than a disclosed prior art.

SUMMARY OF THE DISCLOSURE

An object of the present disclosure is to provide an apparatus for providing learning questions using games, which provides learning questions on the basis of one learning level in a plurality of games, and an operating method of a system for providing learning questions using the same.

Another object of the present disclosure is to provide an apparatus for providing learning questions using games, which provides a set number of evaluation questions to a learner, wherein a next evaluation question is set based on evaluation question solving results of the learner and a learning level of the learner is set based on the results of solving for the set number of evaluation questions, and an operating method of a system for providing learning questions using the same.

Still another object of the present disclosure is to provide an apparatus for providing learning questions using games, in which the solving speed of a learner is set based on the results of solving of a learner for a set number of learning questions and various compensations are provided to the learner within a game based on whether an answer is a correct answer or a wrong answer and the solving speed, and an operating method of a system for providing learning questions using the same.

An apparatus for providing learning questions according to an embodiment of the present disclosure is an apparatus that is communicatively connected to a gaming device. The apparatus includes communication circuitry configured to exchange data with the gaming device, memory, and one or more processors configured to load instructions stored in the memory and to perform one or more operations in response to the execution of the instructions. The one or more processors enable the apparatus for providing learning questions to communicate with the gaming device by controlling the apparatus for providing learning questions, and are configured to output one message, among a learning level evaluation request message and a learning support request message, in response to a question request message received from the gaming device, transmit a first set number of evaluation questions to the gaming device in response to the learning level evaluation request message, receive, from the gaming device, evaluation question solving results of a learner for the first set number of evaluation questions and set a learning level of the learner based on the evaluation question solving results, and transmit, to the gaming device, a second set number of learning questions corresponding to the learning level, in response to the learning support request message.

The one or more processors may output the learning level evaluation request message, when receiving an evaluation question request message as a question request message.

When receiving a learning question request message as the question request message from the gaming device, the one or more processors may detect a learner identifier and/or a game ID in the learning question request message, may transmit a learner detection query including the learner identifier and/or the game ID, may detect learner information in a response message for the learner detection query, and may output the learning level evaluation request message, when not detecting the learning level in the learner information.

The one or more processors may transmit one evaluation question to the gaming device, may detect a next evaluation question, based on evaluation question solving results of the learner for the one evaluation question from the gaming device, and may transmit the next evaluation question to the gaming device.

The one or more processors may detect whether an answer to an evaluation question is a correct answer or a wrong answer in the evaluation question solving results of the gaming device, may detect, as a next evaluation question, a learning question corresponding to a sub-subject having a higher level than a sub-subject of the evaluation question, when detecting the correct answer in the evaluation question solving results, and may detect, as a next evaluation question, a learning question corresponding to a sub-subject having a lower level than a sub-subject of the evaluation question, when detecting the wrong answer in the evaluation question solving results.

The one or more processors may detect the learning level of the learner in response to the learning support request message, may transmit a learning question detection query including the learning level and the second set number, and may detect the second set number of learning questions in a response message for the learning question detection query.

The one or more processors may output an evaluation question transmission request message including one evaluation question, may generate an evaluation question transmission packet including the one evaluation question, in response to the evaluation question transmission request message, and may transmit the evaluation question transmission packet to the gaming device. The evaluation question transmission packet may include a question identifier, question contents, text contents, a correct answer to a question, and a plurality of wrong answers to a question whose priority has been set. In this case, the priority set in the plurality of wrong answers to a question may be set based on a wrong answer rate of learners for a learning question corresponding to the question identifier, and may become higher as the wrong answer rate becomes higher.

The one or more processors may output a learning question transmission request message including the second set number of learning questions, may generate a learning question transmission packet including the second set number of learning questions, in response to the learning question transmission request message, and may transmit the learning question transmission packet to the gaming device.

The one or more processors may output a solving speed setting request message in response to a learning question solving result packet of the gaming device, may set a solving speed of the learner for a learning question in response to the solving speed setting request message, and may detect a question identifier and a question solving time in the solving speed setting request message, transmit a solving speed reference value detection query including the question identifier, detect a solving speed reference value in a response message for the solving speed reference value detection query, and set the solving speed of the learner for the learning question based on the solving speed reference value and the question solving speed.

An operating method of a system for providing learning questions according to an embodiment of the present disclosure is an operating method of a system for providing learning questions, including an apparatus for providing learning questions, which is communicatively connected to a gaming device. The operating method includes receiving, by the apparatus for providing learning questions, a question request message from the gaming device, detecting, by the apparatus for providing learning questions, learner information in response to a learning question request message when the question request message is the learning question request message, transmitting, by the apparatus for providing learning questions, a first set number of evaluation questions to the gaming device, when not detecting a learning level of a learner in the learner information detected in the detecting of the learner information or when the question request message is an evaluation question request message, and setting the learning level of the learner based on evaluation question solving results of the learner for the evaluation questions from the gaming device, and transmitting, by the apparatus for providing learning questions, a second set number of learning questions to the gaming device based on the learning level.

In the setting of the learning level, the apparatus for providing learning questions may transmit the first set number of evaluation questions to the gaming device, may transmit one evaluation question to the gaming device, may detect a next evaluation question based on evaluation question solving results of the learner for the one evaluation question from the gaming device, and may transmit the next evaluation question to the gaming device.

The setting of the learning level may include detecting whether an answer to an evaluation question is a correct answer or a wrong answer in the evaluation question solving results of the gaming device, detecting, as a next evaluation question, a learning question corresponding to a sub-subject having a higher level than a sub-subject of the evaluation question, when detecting the correct answer in the evaluation question solving results, and detecting, as a next evaluation question, a learning question corresponding to a sub-subject having a lower level than a sub-subject of the evaluation question, when detecting the wrong answer in the evaluation question solving results.

The setting of the learning level may include detecting a first evaluation question in learner information in which a learning level has not been set, detecting a second evaluation question based on question solving results of the learner for the first evaluation question from the gaming device, detecting a third evaluation question based on question solving results of the learner for the second evaluation question from the gaming device, detecting a fourth evaluation question based on question solving results of the learner for the third evaluation question from the gaming device, detecting a fifth evaluation question based on question solving results of the learner for the fourth evaluation question from the gaming device, detecting a sixth evaluation question based on question solving results of the learner for the fifth evaluation question from the gaming device, detecting a seventh evaluation question based on question solving results of the learner for the sixth evaluation question from the gaming device, and detecting an eighth evaluation question based on question solving results of the learner for the seventh evaluation question from the gaming device.

The transmitting of the learning questions may include transmitting a learning question detection query including a learning level and the second set number, detecting the second set number of learning questions in a response message for the learning question detection query, generating a learning question transmission packet including the second set number of learning questions, and transmitting the learning question transmission packet to the gaming device.

In the generating of the learning question transmission packet, the apparatus for providing learning questions may generate the learning question transmission packet including a question identifier, question contents, text contents, a correct answer to a question, and a plurality of wrong answers to a question whose priority has been set. In this case, the priority set in the plurality of wrong answers to a question may be set based on a wrong answer rate of learners for a learning question corresponding to the question identifier, and may become higher as the wrong answer rate becomes higher.

The operating method of the system for providing learning questions according to an embodiment of the present disclosure may further include generating, by the gaming device, the second set number of learning questions based on a learning question transmission packet. The generating of the learning questions may include generating a multiple-choice learning question having a question view that may include a correct answer to a question and some of a plurality of wrong answers to the question in the learning question transmission packet.

The generating of the learning questions may include detecting, as the question view, some of the plurality of wrong answers to the question based on a wrong answer rate, and detecting, as the question view, the wrong answers to the question in order of a higher wrong answer rate.

The operating method of the system for providing learning questions according to an embodiment of the present disclosure may further include setting, by the apparatus for providing learning questions, a solving speed of the learner for a learning question in response to a learning question solving result packet of the gaming device. The setting of the solving speed may include detecting a question identifier and a question solving time in the learning question solving result packet, transmitting a solving speed reference value detection query including the question identifier, detecting a solving speed reference value in a response message for the solving speed reference value detection query, and setting the solving speed of the learner, based on the solving speed reference value and a question solving time of the learner.

According to the present disclosure, the apparatus for providing learning questions using games and the operating method of the system for providing learning questions using the same have an effect in that the apparatus and the operating method enable a learner to perform continuous learning although the learner changes various games by providing learning questions based on a learning level of the learner while operating in conjunction with a plurality of gaming devices.

Furthermore, the apparatus for providing learning questions using games and the operating method of the system for providing learning questions using the same have an effect in that the number of learning questions that are managed in a gaming device can be minimized by providing the learning questions to a plurality of gaming devices.

Furthermore, the apparatus for providing learning questions using games and the operating method of the system for providing learning questions using the same have effects in that a learning level of a learner can be accurately determined through the least learning questions and learning questions suitable for the learning level of the learner can be provided to the learner by providing the eight learning questions step by step, but changing a learning question that is provided next based on the results of solving of a previous learning question.

Furthermore, the apparatus for providing learning questions using games and the operating method of the system for providing learning questions using the same have an effect in that a learner does not feel tiresome of learning questions and an accurate learning level of the learner can be determined by evaluating the learning level of the learner through the eight learning questions.

BRIEF DESCRIPTION OF THE DRAWINGS

FIG. 1 is a diagram for describing a system for providing learning questions, including an apparatus for providing learning questions using games according to an embodiment of the present disclosure.

FIG. 2 is a diagram for describing a characteristic in which the apparatus for providing learning questions in FIG. 1 sets a learning level of a learner by providing a gaming device with a first set number of evaluation questions.

FIG. 3 is a diagram for describing a characteristic in which the apparatus for providing learning questions in FIG. 1 sets a learning level of a learner by providing a gaming device with a second set number of evaluation questions.

FIG. 4 is a diagram for describing a construction of the system for providing learning questions, including the apparatus for providing learning questions using games according to an embodiment of the present disclosure.

FIGS. 5 and 6 are diagrams for describing learner information that is stored in a learner information database of FIG. 4.

FIGS. 7 and 8 are diagrams for describing a learning curriculum that is stored in a curriculum database of FIG. 4.

FIG. 9 is a diagram for describing question information that is stored in a question information database of FIG. 4.

FIG. 10 is a block diagram for describing a construction of the apparatus for providing learning questions in FIG. 4.

FIG. 11 is a diagram for describing an evaluation question request message that is received by a control module of FIG. 10 from a gaming device.

FIG. 12 is a diagram for describing a learning question request message that is received by the control module of FIG. 10 from a gaming device.

FIGS. 13 and 14 are diagrams for describing the control module of FIG. 10.

FIG. 15 is a diagram for describing an evaluation question transmission packet that is transmitted from a packet generation module of FIG. 10 to a gaming device.

FIGS. 16 and 17 are diagrams for describing an evaluation question that is generated by the gaming device of FIG. 4 based on an evaluation question transmission packet that is received from the apparatus for providing learning questions.

FIG. 18 is a diagram for describing an evaluation question solving result packet that is transmitted from the gaming device of FIG. 4 to the apparatus for providing learning questions.

FIG. 19 is a diagram for describing a learning question transmission packet that is generated by the packet generation module of FIG. 10.

FIG. 20 is a diagram for describing a learning question solving result packet, that is, a response to the learning question transmission packet of FIG. 19.

FIG. 21 is a diagram for describing an example in which a solving speed setting module sets the solving speed of a learner.

FIG. 22 is a diagram for describing an evaluation result transmission packet that is generated by the packet generation module.

FIG. 23 is a flowchart for describing an operating method of the system for providing learning questions according to an embodiment of the present disclosure.

FIG. 24 is a flowchart for describing a step of detecting learner information in FIG. 23.

FIG. 25 is a flowchart for describing a step of setting a learning level of a learner by using the first set number of evaluation questions in FIG. 23.

FIG. 26 is a flowchart for describing a step of transmitting a second set number of learning questions in FIG. 23 to a gaming device.

FIG. 27 is a flowchart for describing a modified example of the operating method of the system for providing learning questions according to an embodiment of the present disclosure.

FIG. 28 is a flowchart for describing a step of evaluating learning question solving results in FIG. 27.

DESCRIPTION OF SPECIFIC EMBODIMENTS

Hereinafter, preferred embodiments of the present disclosure are described in detail with reference to the accompanying drawings.

Embodiments are provided to more fully explain the present disclosure to a person having ordinary knowledge in the art to which the present disclosure pertains. The following embodiments may be modified in various other forms, and the scope of the present disclosure is not limited to the following embodiments. Rather, these embodiments are provided to make the present disclosure more thorough and complete and to fully convey the spirit of the present disclosure.

Terms used in this specification are used to describe a specific embodiment, and are not intended to limit the present disclosure. Furthermore, in this specification, an expression of the singular number may include an expression of the plural number unless clearly defined otherwise in the context.

It is to be understood that the drawings are merely intended to make understood the spirit of the present disclosure, and the scope of the present disclosure is not restricted by the drawings Referring to FIG. 1, a system for providing learning questions using games 20 according to an embodiment of the present disclosure supports a learner so that the learner can continuously perform learning while playing the game 20 by providing learning questions to a plurality of gaming devices 10.

The gaming device 10 is an apparatus for providing a learner with the game 20, such as a smartphone, a tablet, a desktop, or a gaming server. The gaming device 10 provides a learner with different games 20, such as a farm development game and a flight game, and outputs learning questions, provided by an apparatus 100 for providing learning questions, to the game 20 so that the learner can perform learning along with the game 20. In this case, the gaming device 10 may provide a web-based game or an app-based game.

The apparatus 100 for providing learning questions sets a learning level of a learner. The apparatus 100 for providing learning questions detects learning questions that are detected on the basis of the learning level, and transmits the detected learning questions to the plurality of games 20 that is executed in a plurality of gaming devices 10 and/or the gaming device 10. In this case, if the learning level of the learner has not been set or a learner who has accessed the gaming device 10 uses the games 20 in a guest mode, the apparatus 100 for providing learning questions sets the learning level of the learner.

The apparatus 100 for providing learning questions provides learning questions to the plurality of games 20 that is executed in the gaming device 10, but may provide learning questions that are detected on the basis of one learning level.

For example, the apparatus 100 for providing learning questions may provide learning questions having a first learning level, that is, the learning level of a learner A, to the plurality of games 20 that is executed by the learner A, and may provide learning questions having a second learning level, that is, the learning level of a learner B, to the plurality of games 20 that is executed by the learner B.

Accordingly, the apparatus 100 for providing learning questions enables a learner to perform learning while enjoying various games 20 as per his or her preferences. The apparatus 100 for providing learning questions supports a learner so that the learner can perform the game 20 and learning at the same time by solving learning questions suitable for his or her learning level, while performing the game 20 having a form, which is preferred by the learner.

Furthermore, the apparatus 100 for providing learning questions integrates and manages the learning level (and/or a learning progress) of a learner and learning questions based on the learning level. Accordingly, the learner can perform learning based on the learning level of the learner although the learner changes the gaming device 10 and/or the game 20 because the learning in the gaming device 10 can operate in conjunction with the game 20 in real time.

For example, although a learner changes a farm development game 20 into a flight game 20, which are provided by the gaming device 10, the apparatus 100 for providing learning questions enables the learner to perform learning in the flight game 20 based on a learning level and/or a learning progress in the farm development game 20.

Furthermore, the apparatus 100 for providing learning questions can provide learning questions suitable for a learner, compared to a conventional technology in which learning questions are provided by each of the gaming devices 10, by integrating and managing the learning level of the learner and learning questions based on the learning level.

Furthermore, the apparatus 100 for providing learning questions integrates and manages the learning level of a learner and learning questions based on the learning level. Accordingly, the gaming device 10 does not need to separately manage/store the learning level and the learning questions.

Furthermore, the apparatus 100 for providing learning questions enables a learner to subsequently perform learning that was performed in a learning server (or app), although the learner performs the learning in the learning server (or app) and then uses the gaming device 10 in order to play the game 20.

The apparatus 100 for providing learning questions transmits, to the gaming device 10, evaluation questions for evaluating the learning level of a learner and learning questions for supporting the learning of the learner. In this case, the evaluation question is a learning question that has been detected in order to evaluate/set the learning level of the learner, for example.

First, referring to FIG. 2, if a learner whose learning level has not been set uses the gaming device 10, the apparatus 100 for providing learning questions transmits a plurality of evaluation questions for evaluating the learning level to the gaming device 10.

That is, if the learner has not performed authentication (or login), has not completed the solving of evaluation questions, or uses the gaming device 10 in the guest mode, the apparatus 100 for providing learning questions determines that the learning level of the learner has not been set.

The apparatus 100 for providing learning questions transmits a first set number "n" of evaluation questions to the gaming device 10 in order to set the learning level of a learner. The apparatus 100 for providing learning questions transmits one evaluation question to the gaming device 10 without simultaneously transmitting the first set number "n" of evaluation questions, then detects a next evaluation question based on the results of solving of the learner for the one evaluation question, and transmits the next evaluation question to the gaming device 10.

In this case, the apparatus 100 for providing learning questions does not transmit a preset evaluation question to the gaming device 10, but detects the next evaluation question based on the results of solving of the learner for the one evaluation question, and transmits the detected next evaluation question to the gaming device 10. Accordingly, the apparatus 100 for providing learning questions sets the learning level of a learner by using other evaluation questions for each learner.

For example, the apparatus 100 for providing learning questions detects a first evaluation question that is included in a learning level corresponding to the age, grade, and semester of a learner whose learning level has not been set, and transmits the first evaluation question to the gaming device 10.

The apparatus 100 for providing learning questions determines whether an answer to the first evaluation question is a correct answer or a wrong answer based on first evaluation question solving results of the learner from the gaming device 10. When determining that the answer to the first evaluation question is a correct answer, the apparatus 100 for providing learning questions detects one learning question, among learning questions that are included in a learning level higher than a learning level of the first evaluation question, as a second evaluation question. When determining that the answer to the first evaluation question is a wrong answer, the apparatus 100 for providing learning questions detects one learning question, among learning questions that are included in a learning level lower than the learning level of the first evaluation question, as a second evaluation question.

The apparatus 100 for providing learning questions determines whether the answer to the second evaluation question is a correct answer or a wrong answer, based on second evaluation question solving results by the gaming device 10. When determining that the answer to the second evaluation question is a correct answer, the apparatus 100 for providing learning questions detects one learning question, among learning questions that are included in a learning level higher than the learning level of the second evaluation question, as a third evaluation question. When determining that the answer to the second evaluation question is a wrong answer, the apparatus 100 for providing learning questions detects one learning question, among learning questions that are included in a learning level lower than the learning level of the second evaluation question, as a third evaluation question.

The apparatus 100 for providing learning questions provides the learner with the first set number "n" of evaluation questions and sets the learning level of the learner based on evaluation question solving results of the learner, by repeating such a process.

Referring to FIG. 3, the apparatus 100 for providing learning questions transmits a second set number "m" of learning questions to the gaming device 10 as a learner whose learning level has been set uses the gaming device 10. In this case, the second set number "m" may be identical with the first set number "n".

The apparatus 100 for providing learning questions simultaneously transmits the second set number "m" of learning questions to the gaming device 10, unlike in the transmission of the evaluation questions. The apparatus 100 for providing learning questions receives, from the gaming device 10, learning question solving results, that is, the results of solving of the learner for the second set number "m" of learning questions. The apparatus 100 for providing learning questions may reset the learning level of the learner based on the learning question solving results.

Referring to FIG. 4, the apparatus 100 for providing learning questions according to an embodiment of the present disclosure is communicatively connected to a learner information database 200, a curriculum database 300, and a question information database 400.

The learner information database 200 stores information of a learner who has subscribed to a learning service.

Referring to FIG. 5, the learner information database 200 stores learner information including a learner identifier, an ID, a password, a learner name, an age, a grade, a semester, and a learning level, for example. In this case, the learner identifier is a unique identifier that is assigned to each learner. The ID and the password are login information of a learner who has subscribed to a learning service. The learning level is set through the solving of evaluation questions, and is updated through the solving of learning questions by a learner.

Referring to FIG. 6, the learner information database 200 may store learner information further including a game ID. The learner information may include one or more game IDs. The game ID is the ID of a learner that is used to authenticate the learner in the gaming device 10, and has a combination of a game-unique code, a plurality of numbers and/or text, for example.

The curriculum database 300 stores a learning curriculum that is provided by the learning service. The curriculum database 300 may store learning curriculums, such as a course learning form and/or a subject learning form.

Referring to FIG. 7, the curriculum database 300 stores the learning curriculum having the course learning form, including a learning level, a learning level name, a sub-subject name, detailed contents, a sub-subject code, an education process (e.g., a grade, a semester, a unit, and a unit name), and an age, for example.

Referring to FIG. 8, the curriculum database 300 stores the learning curriculum having the subject learning form, including a course learning name, a step name, a sub-subject code, a sub-subject name, and detailed contents, as another example.

In this case, the learning curriculum is information, that is, a criterion for setting a learning level of a learner, and may be variously set and stored depending on a learning subject or a learning service support company.

The question information database 400 stores a plurality of learning questions that is provided to the gaming device 10.

Referring to FIG. 9, the question information database 400 stores question information, including a question identifier, question contents, text contents, a correct answer to a question, a plurality of wrong answers to a question, and a solving speed reference value. In this case, the question identifier is a unique identifier that is assigned to a learning question. The contents of a question are information that includes an equation and text as the contents of a learning question. The text contents are information that includes text as text of a learning question. The correct answer is information that is used as a criterion for determining the results of solving of a learning question and that is used as a view when a learning question has multiple choice questions. The plurality of wrong answers to a question is information that is used when a learning question has multiple choice questions. The solving speed reference value is a value, that is, a criterion that is used to determine the solving speed of a learner, and may be set as a different value for each learning question.

The question information database 400 may also store a plurality of wrong answers to a question having priority (or a wrong answer rate). In this case, the priority (or the wrong answer rate) is a rank that is used as view information when a learning question has multiple choice questions, and may be set on the basis of a number/ratio in which learners have selected correct answers. That is, the wrong answer to the question has higher priority as the frequency with which a learner selects or inputs a correct answer is increased when the results of solving of a learning question are a wrong answer. As the priority becomes higher, there is a better possibility that a corresponding wrong answer will be used as view information of a learning question.

The apparatus 100 for providing learning questions transmits learning questions to the gaming device 10, in response to a question request message including a learner identifier of the gaming device 10. The apparatus 100 for providing learning questions detects the learner identifier in the question request message. The apparatus 100 for providing learning questions detects learner information corresponding to the learner identifier in the learner information database 200.

If a learning level of the learner is included in the learner information, the apparatus 100 for providing learning questions detects the second set number "m" of learning questions, in the question information database 400 corresponding to the learning level, and transmits the second set number "m" of learning questions to the gaming device 10.

If the learning level is not included in the learner information, the apparatus 100 for providing learning questions transmits the first set number "n" of evaluation questions to the gaming device 10. In this case, the apparatus 100 for providing learning questions transmits the first set number "n" of evaluation questions to the gaming device 10, but transmits one evaluation question to the gaming device 10, detects a next evaluation question based on the results of solving of the learner for the one evaluation question, and transmits the next evaluation question to the gaming device 10. That is, the apparatus 100 for providing learning questions transmits one evaluation question to the gaming device 10, detects an evaluation question to be transmitted next based on the results of solving of the one evaluation question of the gaming device 10, and transmits the detected evaluation question.

More specifically, the apparatus 100 for providing learning questions sets, as a first evaluation question, one learning question that has been detected in the question information database 400, and transmits the first evaluation question to the gaming device 10. The apparatus 100 for providing learning questions receives first evaluation question solving results, that is, the results of solving of the learner for the first evaluation question, from the gaming device 10. The apparatus 100 for providing learning questions detects one learning question in the question information database 400 based on first evaluation question solving results, sets the one learning question as a second evaluation question, and transmits the second evaluation question to the gaming device 10. The apparatus 100 for providing learning questions sequentially transmits the first set number "n" of evaluation questions to the gaming device 10 by repeating the aforementioned process. The apparatus 100 for providing learning questions sets the learning level of the learner based on n-th evaluation question solving results, which have been received from the gaming device 10. In this case, the learning level is a sub-subject (i.e., a sub-subject code) of a learning curriculum, for example.

The apparatus 100 for providing learning questions includes communication circuitry configured to exchange data with the gaming device, memory, and a processor. In this case, the processor may include one or more processors configured to load instructions stored in the memory and to perform one or more operations based on the execution of the instructions. The one or more processors are configured to communicate with the gaming device by controlling the communication circuitry.

Referring to FIG. 10, the apparatus 100 for providing learning questions includes a control module 110, a learning level evaluation module 120, a learning support module 130, a packet generation module 140, and a solving speed setting module 150.

Each of the modules 110 to 150 illustrated in FIG. 10 may correspond to functions that are performed by the apparatus 100 for providing learning questions and a set of the functions, or components that are included in the apparatus 100 for providing learning questions and a combination or the components.

For example, each of the modules 110 to 150 may include one or more processors having operation processing functions and memory coupled with the one or more processors. The processors of each of the modules 110 to 150 may perform an operation of each of the modules 110 to 150 by reading instructions stored in the memory coupled with the processors. Alternatively, two or more of the modules 110 to 150 may be integrally implemented as one or more processors and memory.

Furthermore, at least one of the modules 110 to 150 may include communication circuitry capable of exchanging data with an apparatus (i.e., an external device) disposed outside the apparatus 100 for providing learning questions. The communication circuitry may perform data communication between the external device and the apparatus for providing learning questions under the control of a processor that is included in at least one of the modules 110 to 150.

The control module 110 receives a question request message from one of the plurality of gaming devices 10. In this case, the control module 110 receives the question request message, including a game code, a learner identifier and/or a game ID. The control module 110 receives one of an evaluation question request message and a learning question request message from the gaming device 10.

Referring to FIG. 11, the control module 110 receives, from the gaming device 10, the evaluation question request message including a header and a body. In this case, the header includes a game API key (X-API-KEY). The body includes a game code (gameCd), a member ID (mbrId), a device name (deviceNm), a game version (gameVer), an OS type (osScnCd), a learning language code (langCd), and a time zone (timeZone), for example.

Referring to FIG. 12, the control module 110 receives, from the gaming device 10, the learning question request message including a header and a body. In this case, the header includes a game API key (X-API-KEY) and a member jwt (Json Web Token, Authorization). The body includes a game code (gameCd), a member ID (mbrId), a game version (gameVer), an OS type (osScnCd), a device name (deviceNm), a learning language code (langCd), and a time zone (timeZone), for example.

When a question request message of the gaming device 10 is the learning question request message, the control module 110 generates a learner detection query in response to the question request message. The control module 110 detects a learner identifier and/or a game ID (i.e., a member ID) in the question request message of the gaming device 10. The control module 110 generates the learner detection query including the learner identifier and/or the game ID.

The control module 110 transmits the learner detection query to the learner information database 200. In this case, the control module 110 transmits, to the learner information database 200, the learner detection query including the learner identifier and/or the game ID.

The learner information database 200 transmits, to the control module 110, a response message including learner information in response to the learner detection query of the control module 110. The learner information database 200 detects the learner identifier or the game ID in the learner detection query. The learner information database 200 detects the learner information including the learner identifier or the game ID, among pieces of previously stored learner information, in the learner detection query. The learner information database 200 generates the response message including the learner information, and transmits the response message to the control module 110.

The control module 110 detects the learner information in the response message of the learner information database 200. The control module 110 transmits a learning level evaluation request message to the learning level evaluation module 120 or transmits a learning question transmission request message to the learning support module 130, based on whether the learner information includes a learning level.

Referring to FIG. 13, when detecting learner information not including a learning level, the control module 110 generates a learning level evaluation request message including the learner information. The control module 110 transmits the learning level evaluation request message to the learning level evaluation module 120.

The control module 110 may transmit the learning level evaluation request message to the learning level evaluation module 120 although the evaluation question request message is received from the gaming device 10.

In this case, if learner authentication fails or a learner accesses the gaming device 10 in the guest mode in which learner authentication is not performed, the gaming device 10 transmits the evaluation question request message to the control module 110.

The control module 110 receives a learning level evaluation completion message from the learning level evaluation module 120 as a response to the learning level evaluation request message. The control module 110 detects a learning level in the learning level evaluation completion message, in response to the learning level evaluation completion message. The control module 110 generates a learner information update query including a learner identifier and a learning level, and transmits the learner information update query to the learner information database 200.

The learner information database 200 detects the learner identifier and the learning level in response to the learning information update query of the control module 110. The learner information database 200 updates the learning level of the learner information, including the learner identifier, with the detected learning level. When the update of the learning level is completed, the learner information database 200 generates a response message and transmits the response message to the control module 110.

The control module 110 generates a learning support request message, including the learning level, in response to the response message of the learner information database 200, and transmits the learning support request message to the learning support module 130.

Referring to FIG. 14, when detecting learner information including a learning level, the control module 110 generates a learning support request message including the learning level. The control module 110 transmits the learning support request message to the learning support module 130.

The learning level evaluation module 120 evaluates the learning level of the learner who uses the gaming device 10, in response to the learning level evaluation request message of the control module 110. The learning level evaluation module 120 transmits the first set number "n" of evaluation questions to the gaming device 10, and evaluates the learning level of the learner based on evaluation question solving results of the learner.

In this case, the learning level evaluation module 120 simultaneously transmits the first set number "n" of evaluation questions to the gaming device 10, and does not evaluate the learning level of the learner based on an evaluation question solving result packet, that is, the evaluation question solving results of the learner for the first set number "n" of evaluation questions.

That is, the learning level evaluation module 120 transmits the evaluation question to the gaming device 10 one by one, and receives the evaluation question solving result packet, that is, the evaluation question solving results of the learner for the evaluation questions. The learning level evaluation module 120 detects a next evaluation question based on the evaluation question solving result packet, and transmits the next evaluation question to the gaming device 10.

In this case, the evaluation question is determined based on evaluation question solving results of the learner for a previous evaluation question. A learning question that is set as an evaluation question may be different depending on whether an answer to the evaluation question is a correct answer or a wrong answer.

The learning level evaluation module 120 evaluates the learning level of the learner, based on the first set number "n" of evaluation questions and an evaluation question solving result packet for the first set number "n" of evaluation questions, through such a process.

For example, it is assumed that the learning level evaluation module 120 evaluates the learning level by using eight (a set number) evaluation question.

The learning level evaluation module 120 detects learner information in a learning level evaluation request message in response to a learning level evaluation request of the control module 110. The learning level evaluation module 120 detects the age, grade, and semester of the learner in the learner information. The learning level evaluation module 120 generates a first sub-subject detection query including the age, grade, and semester, and transmits the first sub-subject detection query to the curriculum database 300.

The curriculum database 300 detects the age, grade, and semester in the first sub-subject detection query, in response to the first sub-subject detection query of the learning level evaluation module 120. The curriculum database 300 detects a sub-subject code of a sub-subject that is included in a learning curriculum and that corresponds to the age, grade, and semester that have been detected in the first sub-subject detection query. The curriculum database 300 generates a response message including the detected sub-subject code, and transmits the response message to the learning level evaluation module 120.

The learning level evaluation module 120 detects the sub-subject code in the response message of the curriculum database 300. The learning level evaluation module 120 generates a first evaluation question detection query including the sub-subject code, and transmits the first evaluation question detection query to the question information database 400.

The question information database 400 detects the sub-subject code in the first evaluation question detection query, in response to the first evaluation question detection query of the learning level evaluation module 120. The question information database 400 detects one of a plurality of types of question information including the sub-subject code. The question information database 400 generates a response message including the detected question information, and transmits the response message to the learning level evaluation module 120.

The learning level evaluation module 120 detects the question information in the response message of the question information database 400, and sets the detected question information as a first evaluation question. The learning level evaluation module 120 generates an evaluation question transmission request message including the first evaluation question, and transmits the evaluation question transmission request message to the packet generation module 140.

The learning level evaluation module 120 receives an evaluation question solving result packet, that is, a response to the evaluation question transmission request message, from the packet generation module 140. The learning level evaluation module 120 detects whether an answer to the first evaluation question is a correct answer or a wrong answer, that is, the results of solving of the first evaluation question, based on the evaluation question solving result packet.

When detecting a correct answer as the results of solving of the first evaluation question, the learning level evaluation module 120 generates a second evaluation question detection query including a sub-subject code having a higher level than a sub-subject of the first evaluation question, and transmits the second evaluation question detection query to the question information database 400.

When detecting a wrong answer as the results of solving of the first evaluation question, the learning level evaluation module 120 generates a second evaluation question detection query including a sub-subject code having a lower level than the sub-subject of the first evaluation question, and transmits the second evaluation question detection query to the question information database 400.

The learning level evaluation module 120 detects question information in the response message of the question information database 400, and sets the question information as a second evaluation question. The learning level evaluation module 120 generates an evaluation question transmission request message including the second evaluation question, and transmits the evaluation question transmission request message to the packet generation module 140.

The learning level evaluation module 120 repeatedly performs the aforementioned process until the eight evaluation questions are transmitted and an eight-evaluation question solving result packet is received. The learning level evaluation module 120 sets the learning level of the learner on the basis of the eight-evaluation question solving result packet. The learning level evaluation module 120 generates a learning level evaluation completion message including the learning level, and transmits the learning level evaluation completion message to the control module 110.

The learning support module 130 detects a second set number "m" of learning questions in the question information database 400, in response to the learning support request message of the control module 110.

The learning support module 130 detects the learning level in the learning support request message. The learning support module 130 generates a learning question detection query including the learning level and a set number, and transmits the learning question detection query to the question information database 400.

The question information database 400 detects the learning level and the set number in the learning question detection query, in response to the learning question detection query. The question information database 400 detects a set number of types of question information, among a plurality of types of question information including the learning level. In this case, the question information database 400 randomly detects the set number of types of question information in the plurality of types of question information. The question information database 400 generates a response message including the set number of types of question information, and transmits the response message to the learning support module 130.

The learning support module 130 detects a second set number "m" of pieces of learning question information in the response message of the question information database 400. The learning support module 130 sets the second set number "m" of pieces of learning question information as learning question information. The learning support module 130 generates a learning question transmission request message including the second set number "m" of pieces of learning question information. The learning support module 130 transmits the learning question transmission request message to the packet generation module 140.

The packet generation module 140 generates an evaluation question transmission packet in response to the evaluation question transmission request message of the learning level evaluation module 120. The packet generation module 140 detects one evaluation question in the evaluation question transmission request message. The packet generation module 140 generates an evaluation question transmission packet including the one evaluation question. The packet generation module 140 transmits the evaluation question transmission packet to the gaming device 10.

Referring to FIG. 15, the packet generation module 140 generates an evaluation question transmission packet including a body, and transmits the evaluation question transmission packet to the gaming device 10. In this case, the body includes a result code (result), a result message (msg), a diagnosis ID (data_sid), a progress code (data_prgsCd), a question identifier (data_qstCd), question contents (data_qstCn), text contents (data_textCn), a correct answer to a question (data_qstCransr), a plurality of wrong answers to a question (data_qstWransr), a diagnosis accuracy level (data_accuracy), the number of evaluation questions so far (data_estQstNowNo), the sub-subject code of an evaluation question (data_estPreStgCd), for example. In this case, the text contents, the question contents, the correct answer to a question, and the plurality of wrong answers to a question are contents that are displayed as an evaluation question or a learning question in the game 20. The text contents are provided in various languages, such as English and Korean. The question contents, the correct answer to a question, and the plurality of wrong answers to a question are provided as Latex codes.

The gaming device 10 generates an evaluation question that is output through the game 20, based on the evaluation question transmission packet of the packet generation module 140. The gaming device 10 detects the question contents, the text contents, the correct answer to a question, and the plurality of wrong answers to a question in the evaluation question transmission packet. The gaming device 10 generates an evaluation question including multiple choice questions or subjective questions, based on the detected information. The gaming device 10 is configured to not modify and use the question contents, the text contents, the correct answer to a question, and the plurality of wrong answers to a question, and is configured to modify only the number of wrong answers to questions when generating a multiple-choice evaluation question.

For example, referring to FIG. 16, the gaming device 10 generates a subjective evaluation question, including the text contents and the question contents.

As another example, referring to FIG. 17, the gaming device 10 generates a multiple-choice evaluation question, including the text contents, the question contents, the correct answer to a question, and the plurality of wrong answers to a question. In this case, the gaming device 10 generates the multiple-choice evaluation question including wrong answers to some questions, among a plurality of wrong answers to a question, on the basis of the number of question views. If a four-choice evaluation question is generated, the gaming device 10 generates a multiple-choice evaluation question, including three wrong answers to a question having a high wrong answer rate and a correct answer to the question. In this case, the gaming device 10 generates the multiple-choice evaluation question, including three higher wrong answers to the question, on the basis of priority that has been set based on a wrong answer rate.

The gaming device 10 outputs the evaluation question through the game 20 so that a learner can solve the evaluation question. The gaming device 10 generates an evaluation question solving result packet by monitoring an evaluation question solving process of the learner, and transmits a question solving result packet to the packet generation module 140.

For example, referring to FIG. 18, the gaming device 10 receives an evaluation question solving result packet, including a header and a body, from the gaming device 10. In this case, the header includes a game API key (X-API-KEY) and a member jwt (Authorization). The body includes a game code (gameCd), a member ID (mbrId), a progress code (prgsCd), a diagnosis ID (sid), a question identifier of a solved evaluation question (qstCd, a question identifier), correct answer contents input by a learner (qstCransr), whether an answer to an evaluation question is a correct answer or a wrong answer (ansrCwYn), and a question solving time (slvTime), for example. In this case, whether an answer to an evaluation question is a correct answer or a wrong answer is the results of a determination of whether an answer to an evaluation question is a correct answer or a wrong answer by comparing a correct answer to a question, which has been detected in an evaluation question transmission packet, and correct answer contents that have been input by a learner. The question solving time is the result of measurement from timing at which an evaluation question is output to timing at which a learner inputs correct answer contents for an evaluation question.

The packet generation module 140 receives the evaluation question solving result packet from the gaming device 10 as a response to the evaluation question transmission packet. The packet generation module 140 transmits the evaluation question solving result packet to the learning level evaluation module 120.

The packet generation module 140 generates a learning question transmission packet in response to the learning question transmission request message of the learning support module 130. The packet generation module 140 detects a second set number "m" of pieces of learning question information in the learning question transmission request message. The packet generation module 140 generates the learning question transmission packet including the second set number "m" of pieces of learning question information, and transmits the learning question transmission packet to the gaming device 10.

For example, referring to FIG. 19, the packet generation module 140 generates the learning question transmission packet including a body. The body includes a result code (result), a result message (msg), a learning ID (data_sid), a learning beginning time (data_bgnDt), a question information list (data_qsts), a question identifier (data_qsts_qstCd), question contents (data_qsts_qstCn), text contents (data_qsts_textCn), a correct answer to a question (data_qsts_qstCransr), and a plurality of wrong answers to a question (data_qsts_qstWransr), for example. In this case, the question information list includes a list of a second set number "m" of learning questions. The question identifier, the question contents, the text contents, the correct answer to a question, and the plurality of wrong answers to a question are connected to each item of a question information list. Each of the question identifier, the question contents, the text contents, and the correct answer to a question has a second set number "m".

The gaming device 10 generates a plurality of learning questions in response to the learning question transmission packet of the packet generation module 140. The gaming device 10 detects the question contents, the text contents, the correct answer to a question, and the plurality of wrong answers to a question in the learning question transmission packet. The gaming device 10 generates an evaluation question having multiple choice or subjective questions based on the detected information. The gaming device 10 is configured to not modify and use the question contents, the text contents, the correct answer to a question, and the plurality of wrong answers to a question and to modify only the number of wrong answers to questions when generating a multiple-choice evaluation question.

When generating a multiple-choice learning question, the gaming device 10 generates the multiple-choice learning question, including a correct answer to a question and a wrong answer to the question. The gaming device 10 sets some of a plurality of wrong answers to a question as a question view on the basis of the number of question views of the multiple-choice learning question. In this case, the gaming device 10 sets the question view by sequentially selecting wrong answers to questions, which have been selected as the wrong answers by learners, among the plurality of wrong answers to a question.

The gaming device 10 outputs a game screen, including a plurality of learning questions, in response to the learning question transmission packet of the packet generation module 140. The gaming device 10 detects a second set number "m" of question identifiers, question contents, text contents, correct answers to a question, and a second set number "m" of wrong-answer-to-question groups in the learning question transmission packet. In this case, the wrong-answer-to-question group includes a plurality of wrong answers to a question.

The gaming device 10 generates a game screen, including a plurality of learning questions, based on the detected information. In this case, the gaming device 10 generates the game screen on which the plurality of learning questions is output or the plurality of learning questions is individually output.

The gaming device 10 outputs the second set number "m" of learning questions through the game 20 so that a learner can solve the learning questions. The gaming device 10 generates a learning question solving result packet by monitoring the learning question solving process of the learner, and transmits a learning question solving result packet to the packet generation module 140.

For example, referring to FIG. 20, the gaming device 10 generates the learning question solving result packet, including a header and a body, and transmits the learning question solving result packet to the packet generation module 140. In this case, the header includes a game API key (X-API-KEY) and a member jwt (Json Web Token, Authorization). The body includes a game code (gameCd), a member ID (mbrId), a progress code (prgsCd), a learning ID (sid), a learning beginning time (bgnDt), a question solving result list (data), the question identifier of a solved learning question (data_qstCd, a question identifier), correct answer contents input by a learner (data_qstCransr), whether an answer to a learning question is a correct answer or a wrong answer (data_ansrCwYn), and a question solving time (data_slvTime), for example.

The packet generation module 140 generates a solving speed setting request message in response to the learning question solving result packet of the gaming device 10, and transmits the solving speed setting request message to the solving speed setting module 150. The packet generation module 140 detects a question identifier and a question solving time in the learning question solving result packet. The packet generation module 140 generates the solving speed setting request message, including the question identifier and the question solving time, and transmits the solving speed setting request message to the solving speed setting module 150.

The packet generation module 140 receives a response message for the solving speed setting request message from the solving speed setting module 150. The packet generation module 140 detects a question identifier and a solving speed in the response message, in response to the response message.

The packet generation module 140 generates an evaluation result packet for the learning question solving result packet. The packet generation module 140 generates an evaluation result transmission packet including the solving speed, and transmits the evaluation result transmission packet to the gaming device 10.

For example, referring to FIG. 22, the packet generation module 140 generates the evaluation result transmission packet, including a result code (result), a result message (msg), a solving speed code (data_explSpedCd), a solving speed value (data_explSped), a learning progress state code (data_lrnPrgsStsCd), a solving accuracy code (data_acrcyCd), and a solving accurate rate (data_explAcrcyRt), and transmits the evaluation result transmission packet to the gaming device 10. In this case, the solving speed code may be set based on the question identifier and the solving speed, may be set on the basis of a solving speed for each learning question, or may be set on the basis of an average value of solving speeds for a second set number "m" of learning questions.

The gaming device 10 outputs the results of the evaluation through the game 20 in response to the evaluation result transmission packet of the packet generation module 140. The gaming device 10 detects the solving speed code in the evaluation result transmission packet. The gaming device 10 may use the results of the evaluation in various ways, such as differentially supplying compensations based on whether an answer of the learner is a correct answer or a wrong answer and the solving speed of the learner.

The solving speed setting module 150 sets the solving speed of the learner in response to the solving speed setting request message of the packet generation module 140. In this case, the solving speed setting module 150 may set the solving speed of the learner as one of "Slow", "Normal", and "Fast", for example.

The solving speed setting module 150 detects the question identifier and the question solving time in the solving speed setting request message. The solving speed setting module 150 generates a solving speed reference value detection query including the question identifier, and transmits the solving speed reference value detection query to the question information database 400.

The question information database 400 detects a solving speed reference value in response to the solving speed reference value detection query of the solving speed setting module 150. The question information database 400 generates a response message including the solving speed reference value, and transmits the response message to the solving speed setting module 150.

The solving speed setting module 150 detects the solving speed reference value in the response message of the question information database 400. The solving speed setting module 150 sets the solving speed of the learner for a corresponding learning question by comparing the question solving time with the solving speed reference value. In this case, the solving speed reference value is a value that is set based on the results of solving of a question by learners, and may be set on the basis of question solving times of learners who have solved learning questions.

The solving speed reference value may include a plurality of reference values depending on the number of solving speed classes.

For example, if the solving speeds are classified into "Fast", "Normal", and "Slow", the solving speed reference value may include a first reference value, that is, a criterion for determining the solving speed as "Fast" and a second reference value, that is, a criterion for determining the solving speed as "Slow". The solving speed setting module 150 sets the solving speed of a learner for a corresponding learning question as "Fast" when a problem solving speed is less than the first reference value. The solving speed setting module 150 sets the solving speed of a learner for a corresponding learning question as "Slow" when a problem solving speed is greater than the second reference value. The solving speed setting module 150 sets the solving speed of a learner for a corresponding learning question as "Normal" when a problem solving speed is the first reference value or more to the second reference value or less.

The solving speed reference value may be differently set depending on a learning question.

For example, referring to FIG. 21, when a question solving time of a learner for a first learning question, that is, a question identifier Q0010, is less than 40 seconds, the solving speed setting module 150 sets a first learning question solving speed of the learner as "Fast". When the question solving time of the learner for the first learning question, that is, the question identifier Q0010, is 40 seconds to 84 seconds, the solving speed setting module 150 sets the first learning question solving speed of the learner as "Normal". When the question solving time of the learner for the first learning question, that is, the question identifier Q0010, is greater than 84 seconds, the solving speed setting module 150 sets the first learning question solving speed of the learner as "Slow".

When a question solving time of a learner for a second learning question, that is, a question identifier Q0014, is less than 26 seconds, the solving speed setting module 150 sets a second learning question solving speed of the learner as "Fast". When the question solving time of the learner for the second learning question, that is, the question identifier Q0014, is 26 seconds to 48 seconds, the solving speed setting module 150 sets the second learning question solving speed of the learner as "Normal". When the question solving time of the learner for the second learning question, that is, the question identifier Q0014, is more than 48 seconds, the solving speed setting module 150 sets the second learning question solving speed of the learner as "Slow".

The solving speed setting module 150 may set the solving speed of a learner on the basis of an average or ratio of solving speeds to a second set number "m" of learning questions. The solving speed setting module 150 may set the solving speed of a learner on the basis of the number of learning questions set as "Fast", the number of learning questions set as "Normal", and the number of learning questions set as "Slow", among the second set number "m" of learning questions.

The solving speed setting module 150 generates a response message for the solving speed setting request message, and transmits the response message to the packet generation module 140. The solving speed setting module 150 generates the response message including the solving speed of a learner for each learning question, transmits the response message to the packet generation module 140, and transmits, to the packet generation module 140, the response message including the solving speed associated with a question identifier. The solving speed setting module 150 generates the response message including the solving speed of the learner, transmits, to the packet generation module 140, the response message including the solving speed associated with a learner identifier, and transmits the response message to the packet generation module 140.

Hereinafter, an operating method of a system for providing learning questions according to an embodiment of the present disclosure is described as follows with reference to the accompanying drawings.

Referring to FIG. 23, when a learner accesses the game 20, the gaming device 10 transmits a question request message to the apparatus 100 for providing learning questions. The gaming device 10 transmits one question request message, among a learning question request message and an evaluation question request message, to the apparatus 100 for providing learning questions. The gaming device 10 transmits the evaluation question request message to the control module 110, when the learner fails in learner authentication or the learner accesses the gaming device 10 in the guest mode in which the learner does not perform learner authentication. When the learner succeeds in the learner authentication, the gaming device 10 transmits the learning question request message to the control module 110.

The apparatus 100 for providing learning questions receives the question request message from one gaming device 10, among the plurality of gaming devices 10 (S100).

In step S100, the apparatus 100 for providing learning questions receives the question request message, including a game code, a learner identifier and/or a game ID. The apparatus 100 for providing learning questions receives one question request message, among the evaluation question request message and the learning question request message, from the gaming device 10.

In step S100, the apparatus 100 for providing learning questions receives, from the gaming device 10, the evaluation question request message including a game API key (X-API-KEY), a game code, a member ID, a device name, a game version, an OS type, a learning language code, and a time zone, for example.

In step S100, the apparatus 100 for providing learning questions receives, from the gaming device 10, the learning question request message including a header and a body. In this case, the header includes a game API key and a member jwt. The body includes a game code, a member ID, a game version, an OS type, a device name, a learning language code, and a time zone, for example.

When the question request message received in step S100 is the learning question request message (S200; Yes), the apparatus 100 for providing learning questions detects learner information based on the learning question request message (S300).

When a learning level is not detected in the learner information detected in step S300 (S400; Yes), the apparatus 100 for providing learning questions sets the learning level of the learner by using a first set number "n" of evaluation questions (S500).

In step S500, the apparatus 100 for providing learning questions transmits the first set number "n" of evaluation questions to the gaming device 10. The apparatus 100 for providing learning questions does not simultaneously transmit the first set number "n" of evaluation questions, transmits one evaluation question to the gaming device 10, and then transmits a next evaluation question to the gaming device 10 based on the results of solving of the learner for the one evaluation question. In this case, the apparatus 100 for providing learning questions makes different the next evaluation question that is transmitted to the gaming device 10, based on the results of solving of the learner for a previous evaluation question.

In step S500, the apparatus 100 for providing learning questions transmits the evaluation questions to the gaming device 10 one by one, and receives an evaluation question solving result packet, that is, evaluation question solving results of the learner for the evaluation questions. The apparatus 100 for providing learning questions detects a next evaluation question based on the evaluation question solving result packet, and transmits the next evaluation question to the gaming device 10. In this case, the evaluation question is determined based on evaluation question solving results of the learner for a previous evaluation question. A learning question that is set as an evaluation question may be different depending on whether an answer to the evaluation question is a correct answer or a wrong answer. Accordingly, the apparatus 100 for providing learning questions evaluates and sets the learning level of the learner, based on the first set number "n" of evaluation questions and the evaluation question solving result packet for the first set number "n" of evaluation questions.

The apparatus 100 for providing learning questions transmits a second set number "m" of learning questions to the gaming device 10 based on the learning level that has been set in step S500 (S600).

In step S600, the apparatus 100 for providing learning questions simultaneously transmits the second set number "m" of learning questions to the gaming device 10, unlike the transmission of the evaluation questions. The apparatus 100 for providing learning questions receives learning question solving results, that is, the results of solving of the learner for the second set number "m" of learning questions, from the gaming device 10. The apparatus 100 for providing learning questions may reset the learning level of the learner based on the learning question solving results.

When the question request message received in step S100 is the evaluation question request message (S200; No), the apparatus 100 for providing learning questions omits steps S300 and S400, sets the learning level of the learner through the first set number "n" of evaluation questions (S500), and transmits the second set number "m" of learning questions to the gaming device 10 based on the learning level set in step S500 (S600).

Furthermore, when the learning level is detected in the learner information detected in step S300 (S400; No), the apparatus 100 for providing learning questions omits step S500, and transmits the second set number "m" of learning questions to the gaming device 10 based on the learning level detected in the learner information (S600). In this case, the step of setting the learning level of the learner (S500) is omitted from the operating method of a system for providing learning questions.

The operating method of the system for providing learning questions according to an embodiment of the present disclosure enables a learner to perform learning, while enjoying various games 20, based on his or her preference through the above-described step. The operating method of a system for providing learning questions provides the gaming device 10 of the game 20 that is played by the learner with learning questions corresponding to the learning level of a learner so that the learner can perform the game 20 and learning at the same time by solving the learning questions suitable for his or her learning level while performing the game 20 having a form that is preferred by the learner.

Furthermore, according to the operating method of the system for providing learning questions, a learning level of a learner and learning questions can be integrated and managed based on the learning level in the apparatus 100 for providing learning questions. Accordingly, although the learner changes the game 20, the learner can continuously perform learning based on his or her learning level (and/or a learning progress) because the learning in the gaming device 10 can be associated with the game 20 in real time.

Furthermore, the operating method of the system for providing learning questions enables a learner to continuously perform learning that was being performed in a learning server (or app), although the learner performs the learning in the learning server (or app) and plays the game 20.

Step S300 is described with reference to FIG. 24. The apparatus 100 for providing learning questions detects a learner identifier and/or a game ID in the learning question request message (S310).

The apparatus 100 for providing learning questions generates a learner detection query including the learner identifier and/or the game ID detected in step S310 (S320).

The apparatus 100 for providing learning questions transmits the learner detection query to the learner information database 200 (S330).

The learner information database 200 transmits, to the control module 110, a response message including learner information in response to the learner detection query of the control module 110. The learner information database 200 detects the learner identifier or the game ID in the learner detection query. The learner information database 200 detects the learner information including the detected learner identifier or game ID, among pieces of previously stored learner information, in the learner detection query. The learner information database 200 generates a response message including the learner information, and transmits the response message to the control module 110. When receiving the response message (S340; Yes), the control module 110 detects the learner information in the response message (S350).

Step S500 is described in detail as follows with reference to FIG. 25. In this case, it is assumed that in step S500, the learning level of the learner is set through eight evaluation questions.

The apparatus 100 for providing learning questions detects a first evaluation question and transmits the first evaluation question to the gaming device 10 (S510). The gaming device 10 outputs the first evaluation question through the game 20, and transmits, to the apparatus 100 for providing learning questions, first evaluation question solving results including the results of solving of the learner for the first evaluation question.

The apparatus 100 for providing learning questions detects a second evaluation question based on the first evaluation question solving results received from the gaming device 10, and transmits the second evaluation question to the gaming device 10 (S520).

For example, in step S520, when detecting a correct answer in the first evaluation question solving results, the apparatus 100 for providing learning questions detects a second evaluation question corresponding to a sub-subject having a higher level than a sub-subject of the first evaluation question, and transmits the second evaluation question to the gaming device 10. When detecting a wrong answer in the first evaluation question solving results, the apparatus 100 for providing learning questions detects a second evaluation question corresponding to a sub-subject having a lower level than the sub-subject of the first evaluation question, and transmits the second evaluation question to the gaming device 10.

The gaming device 10 outputs the second evaluation question through the game 20, and transmits, to the apparatus 100 for providing learning questions, second evaluation question solving results including the results of solving of the learner for the second evaluation question.

The apparatus 100 for providing learning questions detects a third evaluation question based on the second evaluation question solving results received from the gaming device 10, and transmits the third evaluation question to the gaming device 10 (S530).

For example, in step S530, when detecting a correct answer in the second evaluation question solving results, the apparatus 100 for providing learning questions detects a third evaluation question corresponding to a sub-subject having a higher level than the sub-subject of the second evaluation question, and transmits the third evaluation question to the gaming device 10. When detecting a wrong answer in the second evaluation question solving results, the apparatus 100 for providing learning questions detects a third evaluation question corresponding to a sub-subject having a lower level than the sub-subject of the second evaluation question, and transmits the third evaluation question to the gaming device 10.

The gaming device 10 outputs the third evaluation question through the game 20, and transmits, to the apparatus 100 for providing learning questions, third evaluation question solving results including the results of solving of the learner for the third evaluation question.

The apparatus 100 for providing learning questions detects a fourth evaluation question based on the third evaluation question solving results received from the gaming device 10, and transmits the fourth evaluation question to the gaming device 10 (S540).

For example, in step S540, when detecting a correct answer in the third evaluation question solving results, the apparatus 100 for providing learning questions detects a fourth evaluation question corresponding to a sub-subject having a higher level than the sub-subject of the third evaluation question, and transmits the fourth evaluation question to the gaming device 10. When detecting a wrong answer in the third evaluation question solving results, the apparatus 100 for providing learning questions detects a fourth evaluation question corresponding to a sub-subject having a lower level than the sub-subject of the third evaluation question, and transmits the fourth evaluation question to the gaming device 10.

The gaming device 10 outputs the fourth evaluation question through the game 20, and transmits, to the apparatus 100 for providing learning questions, the fourth evaluation question solving results including the results of solving of the learner for the fourth evaluation question.

The apparatus 100 for providing learning questions detects a fifth evaluation question based on the fourth evaluation question solving results received from the gaming device 10, and transmits the fifth evaluation question to the gaming device 10 (S550).

For example, in step S550, when detecting a correct answer in the fourth evaluation question solving results, the apparatus 100 for providing learning questions detects a fifth evaluation question corresponding to a sub-subject having a higher level than the sub-subject of the fourth evaluation question, and transmits the fifth evaluation question to the gaming device 10. When detecting a wrong answer in the fourth evaluation question solving results, the apparatus 100 for providing learning questions detects a fifth evaluation question corresponding to a sub-subject having a lower level than the sub-subject of the fourth evaluation question, and transmits the fifth evaluation question to the gaming device 10.

The gaming device 10 outputs the fifth evaluation question through the game 20, and transmits, to the apparatus 100 for providing learning questions, fifth evaluation question solving results including the results of solving of the learner for the fifth evaluation question.

The apparatus 100 for providing learning questions detects a sixth evaluation question based on the fifth evaluation question solving results received from the gaming device 10, and transmits the sixth evaluation question to the gaming device 10 (S560).

For example, in step S560, when detecting a correct answer in the fifth evaluation question solving results, the apparatus 100 for providing learning questions detects a sixth evaluation question corresponding to a sub-subject having a higher level than the sub-subject of the fifth evaluation question, and transmits the sixth evaluation question to the gaming device 10. When detecting a wrong answer in the fifth evaluation question solving results, the apparatus 100 for providing learning questions detects a sixth evaluation question corresponding to a sub-subject having a lower level than the sub-subject of the fifth evaluation question, and transmits the sixth evaluation question to the gaming device 10.

The gaming device 10 outputs the sixth evaluation question through the game 20, and transmits, to the apparatus 100 for providing learning questions, sixth evaluation question solving results including the results of solving of the learner for the sixth evaluation question.

The apparatus 100 for providing learning questions detects a seventh evaluation question based on the sixth evaluation question solving results received from the gaming device 10, and transmits the seventh evaluation question to the gaming device 10 (S570).

For example, in step S570, when detecting a correct answer in the sixth evaluation question solving results, the apparatus 100 for providing learning questions detects a seventh evaluation question corresponding to a sub-subject having a higher level than the sub-subject of the sixth evaluation question, and transmits the seventh evaluation question to the gaming device 10. When detecting a wrong answer in the sixth evaluation question solving results, the apparatus 100 for providing learning questions detects a seventh evaluation question corresponding to a sub-subject having a lower level than the sub-subject of the sixth evaluation question, and transmits the seventh evaluation question to the gaming device 10.

The gaming device 10 outputs the seventh evaluation question through the game 20, and transmits, to the apparatus 100 for providing learning questions, seventh evaluation question solving results including the results of solving of the learner for the seventh evaluation question.

The apparatus 100 for providing learning questions detects an eighth evaluation question based on the seventh evaluation question solving results received from the gaming device 10, and transmits the eighth evaluation question to the gaming device 10 (S580).

For example, in step S580, when detecting a correct answer in the seventh evaluation question solving results, the apparatus 100 for providing learning questions detects an eighth evaluation question corresponding to a sub-subject having a higher level than the sub-subject of the seventh evaluation question, and transmits the eighth evaluation question to the gaming device 10. When detecting a wrong answer in the seventh evaluation question solving results, the apparatus 100 for providing learning questions detects an eighth evaluation question corresponding to a sub-subject having a lower level than the sub-subject of the seventh evaluation question, and transmits the eighth evaluation question to the gaming device 10.

The gaming device 10 outputs the eighth evaluation question through the game 20, and transmits, to the apparatus 100 for providing learning questions, eighth evaluation question solving results including the results of solving of the learner for the eighth evaluation question.

The apparatus 100 for providing learning questions sets the learning level of the learner based on the eighth evaluation question solving results (S590).

For example, in step S590, when detecting a correct answer in the eighth evaluation question solving results, the apparatus 100 for providing learning questions sets, as a learning level of the learner, a sub-subject having a higher level than the sub-subject of the eighth evaluation question. When detecting a wrong answer in the eighth evaluation question solving results, the apparatus 100 for providing learning questions sets, as the learning level of the learner, a sub-subject having a lower level than the sub-subject of the eighth evaluation question.

Step S600 is described below with reference to FIG. 26. The apparatus 100 for providing learning questions detects a learning level of a learner (S610).

The apparatus 100 for providing learning questions generates a question detection query, including the learning level detected in step S610 and a second set number "m", and transmits the question detection query to the question information database 400 (S620). In this case, in step S620, the apparatus 100 for providing learning questions may generate the learning question detection query, including a sub-subject set as the learning level of the learner and the second set number "m", and may transmit the learning question detection query to the question information database 400.

The question information database 400 detects a second set number "m" of pieces of learning question information corresponding to a sub-subject that is included in the learning question detection query. The question information database 400 generates a response message including the detected learning question information and transmits the response message to the apparatus 100 for providing learning questions. When receiving the response message of the question information database 400 (S630; Yes), the apparatus 100 for providing learning questions detects the second set number "m" of pieces of learning question information in the response message (S640).

The apparatus 100 for providing learning questions generates a learning question transmission packet including the second set number "m" of pieces of learning question information, and transmits the learning question transmission packet to the gaming device 10 (S650).

The gaming device 10 generates a second set number "m" of learning questions that are output through the game 20, in response to the learning question transmission packet of the apparatus 100 for providing learning questions (S660).

For example, in step S660, the gaming device 10 detects question contents, text contents, a correct answer to a question, and a plurality of wrong answers to a question in the learning question transmission packet. The gaming device 10 generates a learning question including multiple choice questions or subjective questions by using the detected information. The gaming device 10 is configured to not modify and use the question contents, the text contents, the correct answer to a question, and the plurality of wrong answers to a question and to modify only the number of wrong answers to questions when generating a multiple-choice evaluation question.

When generating the multiple-choice learning question in step S660, the gaming device 10 generates the multiple-choice learning question including a correct answer to a question and a wrong answer to the question. The gaming device 10 sets some of the plurality of wrong answers to a question as a question view on the basis of the number of question views of the multiple-choice learning question. In this case, the gaming device 10 sequentially selects wrong answers to a question, which have been selected by learners as the wrong answers, among the plurality of wrong answers to a question, and sets the selected wrong answers as the question view.

The gaming device 10 outputs a game screen including a plurality of learning questions, in response to the learning question transmission packet of the packet generation module 140 (S670). The gaming device 10 generates the game screen including the second set number "m" of learning questions generated in step S660. In this case, the gaming device 10 generates the game screen on which the plurality of learning questions is simultaneously output or the plurality of learning questions is individually output. Accordingly, the gaming device 10 outputs the second set number "m" of learning questions through the game 20 so that the learner can solve the learning questions.

The gaming device 10 generates a learning question solving result packet by monitoring the learning question solving process of the learner (S680), and transmits the learning question solving result packet to the apparatus 100 for providing learning questions (S690). In step S680, the gaming device 10 may measure a question solving time, that is, the time that is taken for the learner to solve the learning questions, and may generate the learning question solving result packet including the question solving time.

Referring to FIG. 27, the operating method of a system for providing learning questions according to an embodiment of the present disclosure may further include a step S700 of evaluating learning question solving results of the learner.

In step S700, the apparatus 100 for providing learning questions generates an evaluation result transmission packet in response to the learning question solving result packet of the gaming device 10, and transmits the evaluation result transmission packet to the gaming device 10.

The step S700 of evaluating the learning question solving results is described in detail with reference to FIG. 28. The apparatus 100 for providing learning questions detects a question identifier and a question solving time in response to the learning question solving result packet of the gaming device 10 (S710).

The apparatus 100 for providing learning questions generates a solving speed reference value detection query including the question identifier, and transmits the solving speed reference value detection query to the question information database 400 (S720).

The question information database 400 detects a solving speed reference value in response to the solving speed reference value detection query of the apparatus 100 for providing learning questions. The question information database 400 generates a response message including the solving speed reference value, and transmits the response message to the apparatus 100 for providing learning questions. When receiving the response message (S730; Yes), the apparatus 100 for providing learning questions detects the solving speed reference value in the response message (S740).

The apparatus 100 for providing learning questions sets a solving speed of the learner for a corresponding learning question by comparing the question solving time with the solving speed reference value (S750). In this case, the solving speed reference value is a value that is set on the basis of the results of solving of learners for the corresponding learning question, and may be set on the basis of question solving times of the learners who have solved the corresponding learning question. The solving speed reference value may include a plurality of reference values depending on the number of solving speed classes. For example, if the solving speeds are classified into "Fast", "Normal", and "Slow", the solving speed reference value may include a first reference value, that is, a criterion by which the solving speed reference value is determined as "Fast" and a second reference value, that is, a criterion by which the solving speed reference value is determined as "Slow". The solving speed setting module 150 sets the solving speed of a learner for a corresponding learning question as "Fast" when the problem solving speed is less than the first reference value. The solving speed setting module 150 sets the solving speed of the learner for the corresponding learning question as "Slow" when the problem solving speed is greater than the second reference value. The solving speed setting module 150 sets the solving speed of the learner for the corresponding learning question as "Normal" when the problem solving speed is the first reference value or more to the second reference value or less.

In this case, the solving speed reference value is a value, that is, a criterion for setting the solving speed of the learner, and may be differently set depending on a learning question.

The apparatus 100 for providing learning questions generates an evaluation result transmission packet including the solving speed of the learner, and transmits the evaluation result transmission packet to the gaming device 10 (S760). The gaming device 10 outputs the results of the evaluation through the game 20, in response to the evaluation result transmission packet of the apparatus 100 for providing learning questions, and may use the results of the evaluation in various ways within the game 20, such as differentially supplying compensations depending on whether an answer of a learner is a correct answer or a wrong answer and a solving speed of the learner.

The above description is merely a description of the technical spirit of the present disclosure, and those skilled in the art may change and modify the present disclosure in various ways without departing from the essential characteristic of the present disclosure. Accordingly, the embodiments described in the present disclosure should not be construed as limiting the technical spirit of the present disclosure, but should be construed as describing the technical spirit of the present disclosure. The technical spirit of the present disclosure is not restricted by the embodiments. The range of protection of the present disclosure should be construed based on the following claims, and all of technical spirits within an equivalent range of the present disclosure should be construed as being included in the scope of rights of the present disclosure.

As described above, although several embodiments have been described, it is to be understood that the present disclosure may be modified in various ways. For example, proper results may be achieved although the above descriptions are performed in order different from that of the described method and/or the aforementioned elements, such as the system, structure, device or apparatus, and circuit, are combined in a form different from that of the described method or replaced with or supplemented by other elements or equivalents. Accordingly, other implementations of the claims fall within the scope of the claims.

What is claimed is:

1. An apparatus for providing learning questions, the apparatus being communicatively connected to a gaming device storing a plurality of games and comprising:
   communication circuitry configured to exchange data with the gaming device;
   memory; and
   one or more processors configured to load instructions stored in the memory and to perform one or more operations in response to an execution of the instructions,
   wherein the one or more processors enable the apparatus for providing learning questions to communicate with the gaming device by controlling the apparatus for providing learning questions,
   wherein the one or more processors are configured to:
   output one of a learning level evaluation request message or a learning support request message from a control module to a learning level evaluation module or a learning support module of the apparatus for providing learning questions in response to a question request message received from the gaming device,
   transmit a first set number of evaluation questions to the gaming device in response to receiving the learning level evaluation request message at the learning level evaluation module,
   receive, from the gaming device, evaluation question solving results of a learner for the first set number of evaluation questions and set a learning level of the learner based on the evaluation question solving results, and
   transmit, to the gaming device, a second set number of learning questions corresponding to the learning level, in response to receiving the learning support request message at the learning support module,
   wherein the one or more processors generates a learning question transmission packet when a question request message is received from the gaming device, and transmits the learning question transmission packet to the gaming device,
   wherein the question request message includes a game code of a game executed in the gaming device among a plurality of games, and the learning question transmission packet includes the game code of the question request message, question contents, text contents, a correct answer to a question and a plurality of wrong answers to a question based on the learning level of learner,
   wherein the plurality of games executed in the gaming device detects the game code, the question contents, the text contents, the correct answer to a question, and the plurality of wrong answers to a question in the learning question transmission packet, and
   wherein each of the plurality of games generates learning questions having a different form based on the game code, the question contents, the text contents, the correct answer to a question, and the plurality of wrong answers to a question.

2. The apparatus of claim 1, wherein the one or more processors output the learning level evaluation request message to the learning level evaluation module when receiving an evaluation question request message as the question request message.

3. The apparatus of claim 1, wherein the one or more processors, when receiving a learning question request message as the question request message from the gaming device, are further configured to:
   detect a learner identifier and/or a game ID in the learning question request message,
   transmit a learner detection query comprising the learner identifier and/or the game ID to a learner information database,
   detect learner information in a response message for the learner detection query from the learner information database, and
   output the learning level evaluation request message to the learning level evaluation module, when not detecting the learning level in the learner information.

4. The apparatus of claim 1, wherein the one or more processors are further configured to:
   transmit one evaluation question to the gaming device,
   detect a next evaluation question, based on evaluation question solving results of the learner for the one evaluation question from the gaming device, and
   transmit the next evaluation question to the gaming device.

5. The apparatus of claim 1, wherein the one or more processors are further configured to:
   detect whether an answer to an evaluation question is a correct answer or a wrong answer in the evaluation question solving results of the gaming device,
   detect, as a next evaluation question, a learning question corresponding to a sub-subject having a higher level than a sub-subject of the evaluation question, when detecting the correct answer in the evaluation question solving results, and
   detect, as a next evaluation question, a learning question corresponding to a sub-subject having a lower level than a sub-subject of the evaluation question, when detecting the wrong answer in the evaluation question solving results.

6. The apparatus of claim 1, wherein the one or more processors are further configured to:
  detect the learning level of the learner in response to the learning support request message,
  transmit a learning question detection query comprising the learning level and the second set number to a question information database, and
  detect the second set number of learning questions in a response message for the learning question detection query from the question information database.

7. The apparatus of claim 1, wherein:
  the one or more processors are further configured to:
    output, to a packet generation module of the apparatus for providing learning questions, an evaluation question transmission request message comprising one evaluation question,
    generate, at the packet generation module, an evaluation question transmission packet comprising the one evaluation question, in response to the evaluation question transmission request message, and
    transmit the evaluation question transmission packet from the packet generation module to the gaming device, and
  the evaluation question transmission packet comprises a question identifier, question contents, text contents, a correct answer to a question, and a plurality of wrong answers to a question whose priority has been set.

8. The apparatus of claim 7, wherein the priority set in the plurality of wrong answers to a question is set based on a wrong answer rate of learners for a learning question corresponding to the question identifier, and becomes higher as the wrong answer rate becomes higher.

9. The apparatus of claim 1, wherein the one or more processors are further configured to:
  output, to a packet generation module of the apparatus for providing learning questions, a learning question transmission request message comprising the second set number of learning questions,
  generate, at the packet generation module, the learning question transmission packet comprising the second set number of learning questions, in response to the learning question transmission request message, and
  transmit the learning question transmission packet from the packet generation module to the gaming device.

10. The apparatus of claim 1, wherein the one or more processors are further configured to:
  output, from a packet generation module to a solving speed setting module of the apparatus for providing learning questions, a solving speed setting request message in response to a learning question solving result packet of the gaming device,
  set a solving speed of the learner for a learning question in response to the solving speed setting request message, and
  detect, at the solving speed setting module, a question identifier and a question solving time in the solving speed setting request message,
  transmit a solving speed reference value detection query comprising the question identifier from the solving speed setting module to a question information database,
  detect, at the solving speed setting module, a solving speed reference value in a response message for the solving speed reference value detection query from the question information database, and
  set the solving speed of the learner for the learning question based on the solving speed reference value and the question solving speed.

11. An operating method of a system for providing learning questions, the system comprising an apparatus for providing learning questions, which is communicatively connected to a gaming device, and the operating method comprising:
  receiving, by the apparatus for providing learning questions, a question request message from the gaming device;
  in response to the question request message being a learning question request message, detecting, by the apparatus for providing learning questions, learner information;
  in response to the question request message being an evaluation question request message or not detecting a learning level of a learner in the learner information, transmitting, by the apparatus for providing learning questions, a first set number of evaluation questions to the gaming device and setting the learning level of the learner based on evaluation question solving results of the learner for the evaluation questions from the gaming device; and
  transmitting, by the apparatus for providing learning questions, a second set number of learning questions to the gaming device based on the learning level,
  wherein the transmitting of the second set number of learning questions comprises:
    detecting, in the question request message, a game code of a game executed in the gaming device among a plurality of games,
    generating a learning question transmission packet including the game code, question contents, text contents, a correct answer to a question and a plurality of wrong answers to a question based on the learning level of the learner; and
    transmitting the learning question transmission packet to the gaming device;
  wherein a plurality of games executed in a gaming device detects the game code, the question contents, the text contents, the correct answer to a question, and the plurality of wrong answers to a question in the learning question transmission packet, and
  wherein each of the plurality of games generates learning questions having a different form based on the game code, the question contents, the text contents, the correct answer to a question, and the plurality of wrong answers to a question.

12. The operating method of claim 11, wherein in the setting of the learning level, the apparatus for providing learning questions transmits the first set number of evaluation questions to the gaming device, transmits one evaluation question to the gaming device, detects a next evaluation question based on evaluation question solving results of the learner for the one evaluation question from the gaming device, and transmits the next evaluation question to the gaming device.

13. The operating method of claim 11, wherein the setting of the learning level comprises:
  detecting whether an answer to an evaluation question is a correct answer or a wrong answer in the evaluation question solving results of the gaming device;
  detecting, as a next evaluation question, a learning question corresponding to a sub-subject having a higher level than a sub-subject of the evaluation question, when detecting the correct answer in the evaluation question solving results; and detecting, as a next evaluation question, a learning question corresponding to a sub-subject having a lower level than a sub-subject of the evaluation question, when detecting the wrong answer in the evaluation question solving results.

14. The operating method of claim 11, wherein the setting of the learning level comprises:

detecting a first evaluation question in learner information in which a learning level has not been set;

detecting a second evaluation question based on question solving results of the learner for the first evaluation question from the gaming device;

detecting a third evaluation question based on question solving results of the learner for the second evaluation question from the gaming device;

detecting a fourth evaluation question based on question solving results of the learner for the third evaluation question from the gaming device;

detecting a fifth evaluation question based on question solving results of the learner for the fourth evaluation question from the gaming device;

detecting a sixth evaluation question based on question solving results of the learner for the fifth evaluation question from the gaming device;

detecting a seventh evaluation question based on question solving results of the learner for the sixth evaluation question from the gaming device; and detecting an eighth evaluation question based on question solving results of the learner for the seventh evaluation question from the gaming device.

15. The operating method of claim 11, wherein the transmitting of the learning questions comprises:

transmitting a learning question detection query comprising a learning level and the second set number to a question information database; and detecting the second set number of learning questions in a response message for the learning question detection query from the question information database;

wherein the learning question transmission packet includes, for each of the second set number of learning questions; corresponding question contents, text contents, correct answer, and plurality of wrong answers.

16. The operating method of claim 15, wherein the learning question transmission packet further comprises a question identifier, and wherein the plurality of wrong answers to a question have a priority that has been set.

17. The operating method of claim 16, wherein the priority set in the plurality of wrong answers to a question is set based on a wrong answer rate of learners for a learning question corresponding to the question identifier, and becomes higher as the wrong answer rate becomes higher.

18. The operating method of claim 11, further comprising generating, by the gaming device, the second set number of learning questions based on the learning question transmission packet, wherein the generating of the learning questions comprises generating a multiple-choice learning question having a question view that comprises the correct answer to the question and some of the plurality of wrong answers to the question included in the learning question transmission packet.

19. The operating method of claim 18, wherein the generating of the learning questions comprises detecting, as the question view, some of the plurality of wrong answers to the question based on a wrong answer rate, and detecting, as the question view, the wrong answers to the question in order of a higher wrong answer rate.

20. The operating method of claim 11, further comprising setting, by the apparatus for providing learning questions, a solving speed of the learner for a learning question in response to a learning question solving result packet of the gaming device, wherein the setting of the solving speed comprises:

detecting a question identifier and a question solving time in the learning question solving result packet;

transmitting a solving speed reference value detection query comprising the question identifier to a question information database;

detecting a solving speed reference value in a response message for the solving speed reference value detection query from the question information database; and setting the solving speed of the learner, based on the solving speed reference value and a question solving time of the learner.

\* \* \* \* \*